(12) United States Patent
Kawasaki

(10) Patent No.: US 9,069,182 B2
(45) Date of Patent: Jun. 30, 2015

(54) TUBE LENS, IMAGING OPTICAL SYSTEM AND MICROSCOPE

(75) Inventor: Kenji Kawasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 523 days.

(21) Appl. No.: 13/455,472

(22) Filed: Apr. 25, 2012

(65) Prior Publication Data

US 2012/0281082 A1    Nov. 8, 2012

(30) Foreign Application Priority Data

May 2, 2011  (JP) .................................. 2011-102738

(51) Int. Cl.
| | | |
|---|---|---|
| *G02B 21/02* | (2006.01) | |
| *G02B 21/00* | (2006.01) | |
| *G02B 21/06* | (2006.01) | |
| *G02B 25/00* | (2006.01) | |
| *G02B 9/14* | (2006.01) | |
| *G02B 21/36* | (2006.01) | |
| *G02B 15/173* | (2006.01) | |

(52) U.S. Cl.
CPC .............. *G02B 21/361* (2013.01); *G02B 21/06* (2013.01); *G02B 21/0032* (2013.01); *G02B 15/173* (2013.01)

(58) Field of Classification Search
CPC .. G02B 15/173; G02B 21/0032; G02B 21/06; G02B 21/08; G02B 21/361
USPC .......................... 359/645, 660, 661, 785, 368
See application file for complete search history.

(56) References Cited

U.S. PATENT DOCUMENTS

| | | | |
|---|---|---|---|
| 5,175,652 A | 12/1992 | Shimizu | |
| 5,383,058 A * | 1/1995 | Yonezawa | 359/687 |
| 5,500,770 A | 3/1996 | Zinter et al. | |
| 6,292,306 B1 * | 9/2001 | Betensky | 359/663 |
| 6,807,014 B2 * | 10/2004 | Kawasaki | 359/687 |
| 7,362,511 B2 * | 4/2008 | Suzuki | 359/687 |
| 7,593,157 B2 * | 9/2009 | Suzuki et al. | 359/380 |
| 7,880,963 B2 * | 2/2011 | Matsui | 359/380 |
| 7,952,800 B2 * | 5/2011 | Nakayama | 359/434 |
| 2010/0172029 A1 | 7/2010 | Nakayama | |

FOREIGN PATENT DOCUMENTS

| | | |
|---|---|---|
| JP | 63-311222 A | 12/1988 |
| JP | 11-316337 A | 11/1989 |
| JP | 1073768 A | 3/1998 |
| JP | 11316337 A | 11/1999 |
| JP | 2002-090634 A | 3/2002 |
| JP | 2003-075720 A | 3/2003 |
| JP | 2003161884 A | 6/2003 |
| JP | 2004-144932 A | 5/2004 |
| JP | 2004184825 A | 7/2004 |
| JP | 2009-222971 A | 10/2009 |

OTHER PUBLICATIONS

Japanese Office Action dated Nov. 18, 2014, issued in counterpart Japanese Application No. 2011-102738.

* cited by examiner

*Primary Examiner* — Thomas K Pham
*Assistant Examiner* — Nicholas Pasko
(74) *Attorney, Agent, or Firm* — Holtz, Holtz, Goodman & Chick PC

(57) ABSTRACT

A tube lens used in combination with an objective of the infinity correction type that enlarges the image of an object includes a first lens group including a cemented lens and having a positive power, a second lens group having a negative power, and a third lens group including a positive lens and a negative lens and having a positive power as a whole, in this order from the object side.

9 Claims, 21 Drawing Sheets

TUBE LENS, IMAGING OPTICAL SYSTEM AND MICROSCOPE

CROSS-REFERENCE TO RELATED APPLICATION

This application is based upon and claims the benefit of priority from the prior Japanese Patent Application No. 2011-102738, filed May 2, 2011, the entire contents of which are incorporated herein by this reference.

BACKGROUND OF THE INVENTION

1. Field of the Invention

The present invention relates to a tube lens used for a microscope, an imaging optical system and a microscope that has the tube lens.

2. Description of the Related Art

A tube lens of a microscope is a lens for collecting parallel light flux from an objective, and enlarges and projects the light from an object on the sample surface onto the image surface. Accordingly, with the microscope, an object may be observed as an enlarged image, while the aberration on the image surface needs to be corrected in order to obtain an enlarged image of a good quality.

As a scheme to correct aberration on the image surface, the compensation free scheme in which the objective and the tube lens individually correct aberration to correct aberration on the image surface has been known, and has been widely used conventionally. Various tube lenses that are suitable for the compensation free scheme have been proposed and disclosed in Japanese Laid-open Patent Publication No. 2004-144932, Japanese Laid-open Patent Publication No. 2003-75720, Japanese Laid-open Patent Publication No. H4-93911, for example.

In the compensation free scheme, the object may be observed with an enlarged image of a good quality by using an objective and a tube lens for which aberration is corrected in a good condition respectively.

Incidentally, in recent years, as one of applications of a microscope, the virtual slide system has attracted attention. The virtual slide system is a system in which a pathological sample is scanned to capture its images at a certain level of high magnification, and a large image that displays the entirety of the pathological sample (hereinafter, referred to as a virtual slide image) is generated by joining the obtained images of different areas of the pathological sample (hereinafter, referred to as original images), and the generated virtual slide image is used for pathological diagnosis. Since the virtual slide system enables pathological diagnosis at a distant place through a network, it is expected as an effective solution for problems such as increases in the number of diagnosis and uneven distribution of pathologists.

Since the virtual slide image is displayed while being enlarged or contracted as needed, it needs to have a sufficient resolution that is good for enlarged display. Therefore, the image of the pathological sample needs to be captured at a certain level of high magnification.

However, the greater the magnification for imaging, the smaller the areas of the pathological sample captured in a original image, leading to an increase in the number of original images required for generating the virtual slide image. In addition, since the virtual slide image is generated by joining the original images, there is a need to suppress change in the image quality between the center part and the peripheral part of the original image.

For this reason, in order to realize a virtual slide system of a high throughput that generates a virtual slide image of a good image quality, the tube lens used for the virtual slide system needs to have a wide field of view, and the curvature of the image surface needs to be corrected in a good condition within the range of the field of view.

SUMMARY OF THE INVENTION

An embodiment of the present invention provides a tube lens that is used in combination with an objective of the infinity correction type that enlarges the image of an object including a first lens group including a cemented lens and having a positive power, a second lens group having a negative power, and a third lens group including a positive lens and a negative lens and having a positive power as a whole, in this order from the object side.

Another embodiment of the present invention provides an imaging optical system including a tube lens of an embodiment of the present invention Yet another embodiment of the present invention provides a microscope including a tube lens of an embodiment of the present invention.

BRIEF DESCRIPTION OF THE DRAWINGS

The present invention will be more apparent from the following detailed description when the accompanying drawings are referenced.

DESCRIPTION OF EMBODIMENTS

First, the outline of the configuration of microscope including a tube lens according to each embodiment of the present invention is explained.

Figure 1:
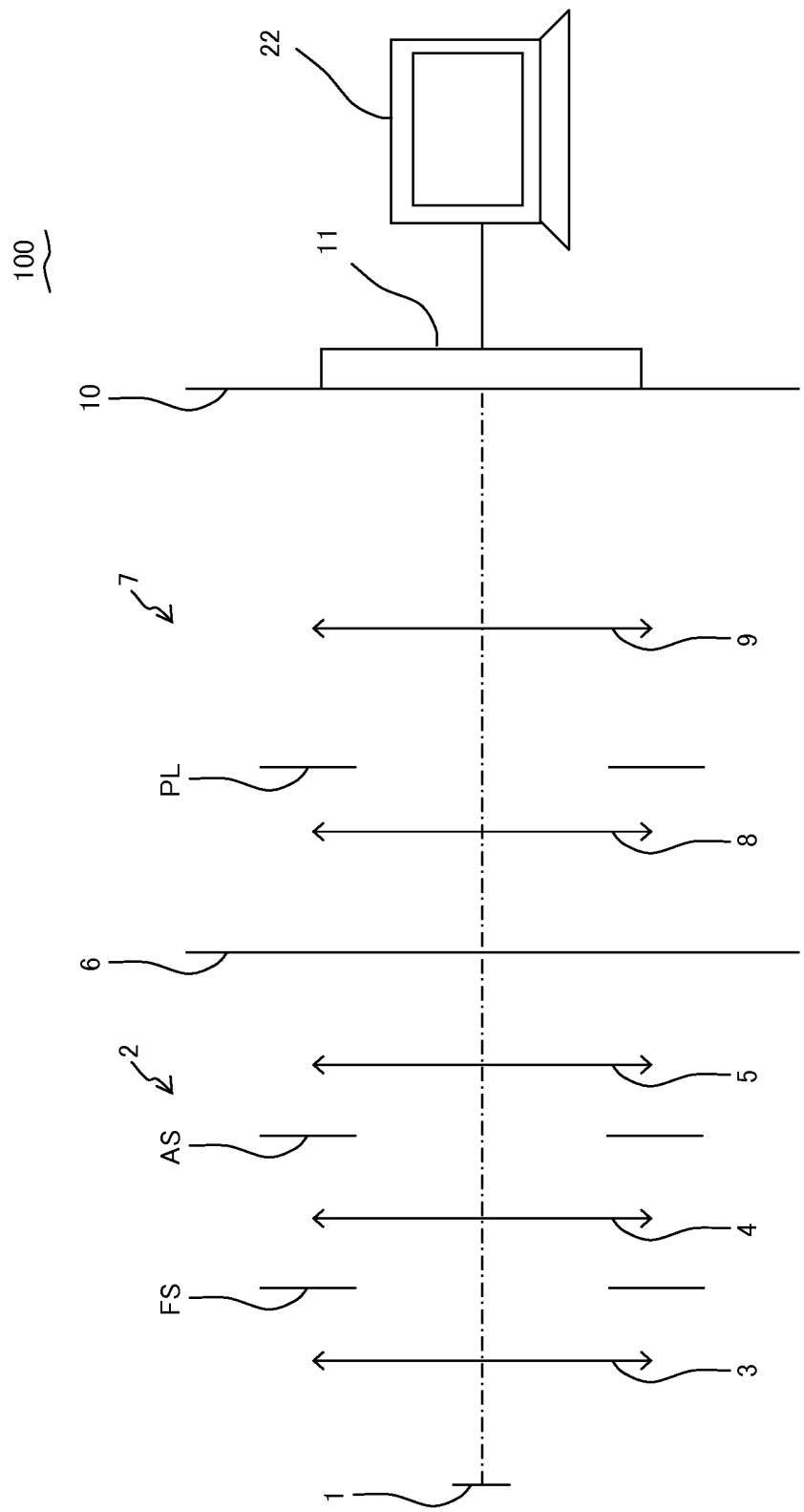
FIG. 1 is a conceptual diagram of a microscope according to an embodiment of the present invention.

FIG. 1 is a conceptual diagram illustrating the configuration of a microscope according to an embodiment of the present invention. A microscope 100 illustrated in FIG. 1 includes a light source 1 that outputs illumination light, an illumination optical system 2 that illuminates an object by Kohler illumination, an imaging optical system 7 that includes a tube lens 9 according to an embodiment of the present invention, an imaging device 11 placed on an image surface 10, and a display device 22 that receives a signal from the imaging device 11 and displays an image. As the imaging device 11, for example, a CCD image sensor that is large with a diagonal length of about 30 mm and has a number of pixels that corresponds to high-resolution images.

The illumination optical system 2 includes collector lens 3, a field stop FS, a relay lens 4, an aperture stop AS, and a condenser lens 5, in this order from the light source 1 side. The field stop FS is placed in the vicinity of a position that is optically conjugate with a sample surface 6 on which an object (for example, a pathological sample) to be the target of imaging that is not illustrated in the drawing is placed. The aperture stop AS is placed in the vicinity of a front-side focal position of the condenser lens 5, which is also in the vicinity of a position that is optically conjugate with the light source 1.

The imaging optical system 7 includes an objective 8 of the infinity correction type for which aberration is corrected in a good condition and a tube lens 9, in this order from the sample surface 6 side. The tube lens 9 is a tube lens that has a broad field of view with aberration being corrected in a good condition within the range of the field of view. Meanwhile, the tube lens 9 is to be described in detail later.

Illumination light output from the light source 1 is converted into an approximately parallel light, flux by the collector lens 3, goes through the field stop ES and falls on the relay lens 4. The relay lens 4 collects the illumination light on the aperture stop AS in the vicinity of the front-side focal point of the condenser lens 5, to form the image of the light source 1. The condenser lens 5 converts the illumination light from the image of the light source 1 formed in the vicinity of the front-side focal point into an approximately parallel light flux and project it onto the sample surface 6.

The light from the object on the sample surface 6 is converted into an approximately parallel light flux by the objective 8, goes through an exit pupil position PL of the objective, and falls on the tube lens 9. Then, with the tube lens 9 collecting the incoming light on the image surface 10, an enlarged image of the object on the sample surface 6 is formed on the image surface 10 and displayed on the display device 22.

According to the microscope 100, since it include the imaging optical system 7 (the objective 8, the tube lens 9) that has a broad field of view and aberration is corrected in a good condition within the range of the field of view and the imaging device 11 that has a large diagonal length and corresponds to high-resolution images, an image of a wide field may be captured with a good image quality.

In addition, since the principal ray from the object on the sample surface 6 illuminated by Kohler illumination falls on the objective 8 approximately in parallel to the optical axis, the exit pupil position PL of the objective 8 approximately corresponds to the back-side focal position of the objective 8. The tube lens 9 according to an embodiment of the present invention is designed to output the principal ray that goes through the back-side focal position of the objective 8 approximately in parallel to the optical axis towards the imaging device 11 on the image surface 10. Therefore, according to the microscope 100, since a high telecentricity is realized at the image side, the influence of the incident angle dependence that the image device 11 such as the CCD image sensor has may be suppressed. For this reason, the peripheral area on which off-axis light fall does not become excessively dark, making it possible to capture an image that is bright from the center to the periphery.

Meanwhile, while the microscope 100 that has a transmitted illumination apparatus (the light source 1, the illumination optical system 2) is illustrated in FIG. 1, the configuration of the microscope including the tube lens according to each embodiment described later is not particularly limited to this configuration. A similar effect may be obtained with a microscope that has an epi-illumination apparatus. Meanwhile, considering the incident angle dependence of the imaging device, a microscope adopting Kohler illumination is desirable.

Next, the configurations and operations that are common among the tube lenses according to each embodiment of the present invention are explained.

The tube lenses according to each embodiment are all, as already mentioned earlier, a tube lens used in combination with an objective of the infinity correction type that enlarges the image of an object, and operate so as to collect an parallel light flux from the objective on the image surface to form an image of the object. The entrance pupil position of the tube lens, that is, the exit pupil position of the objective is located on the object side with respect to the tube lens. Meanwhile, generally, the tube lens has a characteristic that its performance changes significantly depending on the distance to the entrance pupil position of the tube lens.

The tube lenses according to each embodiment described later are all composed of a first group having a positive power including a cemented lens, a second lens group having a negative power, and a third lens group having a positive power as a whole including a positive lens and a negative lens, in this order from the object side. The first lens group preferably includes a lens whose concave side faces an image side. The second lens group preferably includes a lens whose concave side faces the object side.

The first lens groups mainly undertakes a role of converting a parallel light flux from the objective into a convergent light flux to lower the off-axis light beam height by its positive power, and a role to correct spherical aberration and axial chromatic aberration by the cemented lens included in the first lens group.

The second lens group outputs a light beam while raising the light beam height towards the third lens group, by deflecting the parallel light flux from the first lens group in the diffusing direction to weaken its degree of convergence by its negative power.

The third lens group mainly undertakes a role to correct chromatic aberration of magnification and distortion generated on the first lens group and the second lens group to maintain a balance between axial aberration and off-axis aberration by including a positive lens and a negative lens, and a role to collect the light beam on the image surface by the positive power that it has as a whole. Meanwhile, the principal ray of the off-axis light beam becomes highest in the third lens group.

For the tube lens, spherical aberration, astigmatism, coma aberration and Petzval sum may be corrected in a good condition by configuring the lens groups as positive-negative-positive and making the second lens group a lens group having a negative power. In addition, since a high telecentricity may be maintained at the image side even there is a long distance from the entrance pupil position of the tube lens (the exit pupil position of the objective) to the tube lens in such a configuration, axial aberration and off-axis aberration may be corrected in a good condition. Furthermore, since the curvature of the image surface and astigmatism are also corrected, an image that is even from the center to the periphery and covering a wide field of view may be formed on the image surface.

Meanwhile, in the case in which the tube lens includes a lens whose concave side faces the image side in the first lens group, when a convergent light flux converted from a parallel light flux by the first lens group falls on the concave side facing the image side, the incident angle of the convergent light flux becomes small. For this reason, the negative power that the concave side has operates so as to suppress spherical aberration, coma aberration and astigmatism generated in the first lens group. In addition, the negative power that the concave side has also contributes to decreasing Petzval sum.

In addition, in a case in which the tube lens includes a lens whose concave side faces the object side in the second lens group, when a convergent light flux, the flux is output from the first lens group and input to the second lens group, fails on the concave side facing the object, the incident angle of the convergent light flux becomes large. For this reason, the negative power that the concave side has operates strongly on the convergent light flux, and generates aberration in a direction that offsets spherical aberration, coma aberration and astigmatism generated in the first lens group.

Therefore, the configuration of the tube lens including a lens whose concave side faces the image side in the first lens group and including a lens whose concave side faces the object side in the second lens group makes it possible to suppress the amount of spherical aberration, coma aberration, astigmatism generated in the light output from the second lens group through the first lens group to be as small as possible, and to correct the curvature of the image surface in a better condition.

Furthermore, the tube lens is configured so as to satisfy a conditional expression (1) below.

$$0.3 < D2/FL < 1.3 \quad (1)$$

Here, FL is the focal length of the tube lens, D2 is the distance from the lens surface of the tube lens that is closest to the objective to the exit pupil position of the objective.

The conditional expression (1) expresses a condition to correct axial spherical aberration and coma aberration and astigmatism of the off-axis light beam in a good condition, in a case in which the entrance pupil position (the exit pupil position of the objective) is located on the object side of the tube lens. In addition, by satisfying the conditional expression (1), the tube lens may realize a high telecentricity with respect to the exit pupil position, making it possible to output the light beam output from the tube lens in a preferable condition for the imaging device such as a COD image sensor (that is, in a condition that is approximately parallel to the optical axis).

When the upper limit value is exceeded in the conditional expression (1), the entrance pupil position (the exit pupil position of the objective) becomes too far from the first lens group. For this reason, the off-axis light beam height when falling on the first lens group becomes extremely high, making spherical aberration and coma aberration and astigmatism of the off-beam light beam large. In addition, the telecentricity at the image side also decreases. Furthermore, since the outer diameter of the tube lens also becomes large, the manufacturability also decreases. On the other hand, below the lower limit value, the entrance pupil position becomes too close to the first lens group. For this reason, the off-axis light beam height when falling on the first lens group does not become sufficiently high. Therefore, it becomes difficult to correct off-axis coma aberration and astigmatism in a good condition. In addition, the telecentricity at the image side also decreases.

By making the configuration as described above, the tube lens may have a wide field of view, and aberration may be corrected in a good condition within the range of the field of view.

In addition, it is desirable that the tube lens satisfies the conditional expressions below.

$$0.3 < FLG1/FL < 3 \quad (2)$$

$$-4 < FLG2/FL < -0.15 \quad (3)$$

$$0.3 < D1/D0 < 0.8 \quad (4)$$

Here, FLG1 is the focal length of the first lens group and FLG2 is the focal length of the second lens group. In addition, D0 is the distance from the lens surface of the tube lens that is closest, to the objective to the image surface, and D1 is distance from the lens surface of the tube lens that is closest to the objective to the lens surface of the tube lens that is closest to the image surface.

The conditional expression (2) is an expression that defines the relationship between the focal length of the first lens group and the focal length as a whole. The conditional expression (3) is an expression that defines the relationship between the focal length of the second lens group and the focal length as a whole. By satisfying the conditional expression (2) and the conditional expression (3), the power distribution to the first lens group and the second lens group of the tube lens is set to an appropriate condition. Accordingly, for the tube lens, spherical aberration and coma aberration may be corrected in a better condition for the tube lens as a whole, and Petzval sum may be decreased by the negative power of the second lens group to correct the curvature of the image surface in a better condition.

When the upper limit value is exceeded in the conditional expression (2), the power of the first lens group becomes too weak with respect to the power of the tube lens as a whole. For this reason, in the same manner, the other lens groups including the second lens group also become weak with respect to the power of the tube lens as a whole. Accordingly, Petzval sum becomes large, deteriorating the curvature of the image surface and coma aberration. On the other hand, below the lower limit value, the power of the first lens group becomes too strong with respect to power of the tube lens as a whole. Accordingly, for this reason, in the same manner, the other lens groups including the second lens group also become strong with respect to the power of the tube lens as a whole, deteriorating spherical aberration, coma aberration. In addition, since the power of each lens group is strong and the sensitivity to eccentricity high, various aberrations deteriorate only with a slight eccentricity of the lens.

When the upper limit value is exceeded in the conditional expression (3), the power of the second lens group becomes too strong with respect to the power of the tube lens as a whole. Accordingly, in the same manner, the power of the other lens groups becomes strong with respect to the power of the tube lens as a whole, deteriorating spherical aberration, coma aberration. In addition, since the power of each lens group is strong and the sensitivity to eccentricity high, various aberrations deteriorate only with a slight eccentricity of the lens. On the other hand, below the lower limit value, the power of the second lens group becomes too weak with respect to the power of the tube lens as a while. Accordingly, Petzval sum becomes large, deteriorating the curvature of the image surface and coma aberration.

The conditional expression (4) is an expression defining the relationship between the distance from the lens surface (hereinafter, referred to as the first surface) of the tube lens that is closest to the objective to the image surface that is the imaging position, and the total length of the tube lens that is the distance from the first surface to the lens surface (hereinafter, referred to as the last surface) of the tube lens that is closest to the image surface. By satisfying the conditional expression (4), the tube lens may correct spherical aberration, coma aberration and astigmatism on the image surface without making the total length extremely long, and a high telecentricity may be realized at the image side.

When the upper limit value is exceeded in the conditional expression (4), the distance from the third lens group to the imaging position becomes too short. For this reason, it becomes difficult to place the imaging device, the optical path splitting element, and the parfocality adjusting mechanism to be placed on the image side of the tube lens. On the other hand, below the lower limit, value, the distance from the first lens group to the third lens group becomes too short, making it difficult to correct spherical aberration and coma aberration. In addition, even in a case in which spherical aberration and coma aberration are corrected, since the power of each lens group becomes too strong, the sensitivity to the eccentricity increases, and various aberrations deteriorate only with a slight eccentricity of the lens.

In addition, it is desirable that the tube lens satisfies the conditional expressions below.

$$0 < |RG2/RG1| < 3 \quad (5)$$

$$1.5 < NdG2 \quad (6)$$

$$70 < vdG1 \quad (7)$$

Here, RG1 is the radius of curvature of the concave side of the lens whose concave side faces the image side in the first lens group, and RG2 is the radius of curvature of the concave side of the lens whose concave side faces the image side in the second lens group. NdG2 is the refraction index of the lens whose concave face faces the object side in the second lens group with respect to the d line, and vdG1 is the highest Abbe number in the Abbe numbers of lenses having a positive power included in the first lens group. Meanwhile, when there are a plurality of concave sides facing the image side in the first lens group, RG1 is the radius of curvature of the concave side that is closest to the image side.

The conditional expression (5) is an expression defining the ratio of the radius of curvature of the concave side facing the image side of the lens included in the first lens group to the radius of curvature of the concave side facing the object side of the lens included in the second lens group. Meanwhile, the conditional expression (5) is based on a presupposition that the first lens group include a lens whose concave side faces the image side, and the second lens group includes a lens whose concave side faces the object side. By satisfying the conditional expression (5), these lenses effectively contribute to suppressing aberration, making it possible to suppress the amount of various aberrations generated in the light output from the second lens group through the first lens group to a smaller amount.

When the upper limit value is exceeded in the conditional expression (5), the radius of curvature of the concave side of the lens facing the image side included in the first lens group becomes too small, or the radius of curvature of the concave side of the lens facing the object side included in the second lens group becomes too large. When the radius of the curvature of the concave side facing the image side becomes too small, the negative power generated on the concave side of the first, lens group becomes too strong, deteriorating spherical aberration, coma aberration and astigmatism. In addition, when the radius of curvature of the concave side facing the object side becomes too large, the negative power of the second lens group becomes too weak, deteriorating the curvature of the image surface and coma aberration.

The conditional expression (6) is an expression defining the refraction index of the d line of the lens whose concave side faces the object side included in the second lens group. By satisfying the conditional expression (6), Petzval sum may be suppressed to correct the curvature of the image surface in a good condition, making it possible to decrease the amount of spherical aberration, astigmatism, coma aberration generated in each lens group. Below the lower limit value in the conditional expression (6), since the radius of curvature of the concave side facing the object side of the lens included in the second lens group needs to be very small in order to generate the required power, it becomes difficult to correct spherical aberration, coma aberration, the curvature of the image surface in a good condition as a whole.

The conditional expression (7) is an expression defining the highest Abbe number in the Abbe numbers of the lenses having a positive power included in the first lens group. By satisfying the conditional expression (7), spherical aberration and axial chromatic aberration may be corrected in a good condition in the first lens group in which the on-axis light beam height becomes highest. Below the lower limit value in the conditional expression (7), it becomes impossible to correct, spherical aberration and axial chromatic aberration in a good condition.

In addition, it is desirable that the tube lens satisfied the conditional expressions below $$NdC3p > 1.7 \quad (8)$$

$$vdG3n < 40 \quad (9)$$

Here, NdG3p is the refraction index of the positive lens with respect to the d line included in the third lens group, and vdG3n is Abbe number of the negative lens included in the third lens group.

The conditional expression (8) is an expression defining the refraction index with respect to the d line of the positive lens included in the third lens group. By satisfying the conditional expression (8), it becomes possible to decrease, by the positive of the third lens group, distortion generated by the negative power of the second lens group, while correcting off-axis coma aberration in a good condition. Below the lower limit value, the radius of curvature of the lens surface of the positive lens included in the third lens group becomes small, deteriorating coma aberration or distortion.

The conditional expression (9) is an expression defining the Abbe number of the negative lens included in the third lens group. By satisfying the conditional expression (9), off-axis chromatic aberration of magnification may be corrected in the third lens group in which the off-axis principal ray becomes highest. When the upper limit value is exceeded, it becomes difficult to correct chromatic aberration of magnification in a good condition.

In addition, any combination of the conditional expression (2) through the conditional expression (9) may be applied to the tube lens that satisfied the conditional expression (1). In addition, each expression may be defined only with either one of the upper limit value and the lower limit value.

Hereinafter, the tube lens according to each embodiment is specifically explained.

<Embodiment 1>

Figure 2:
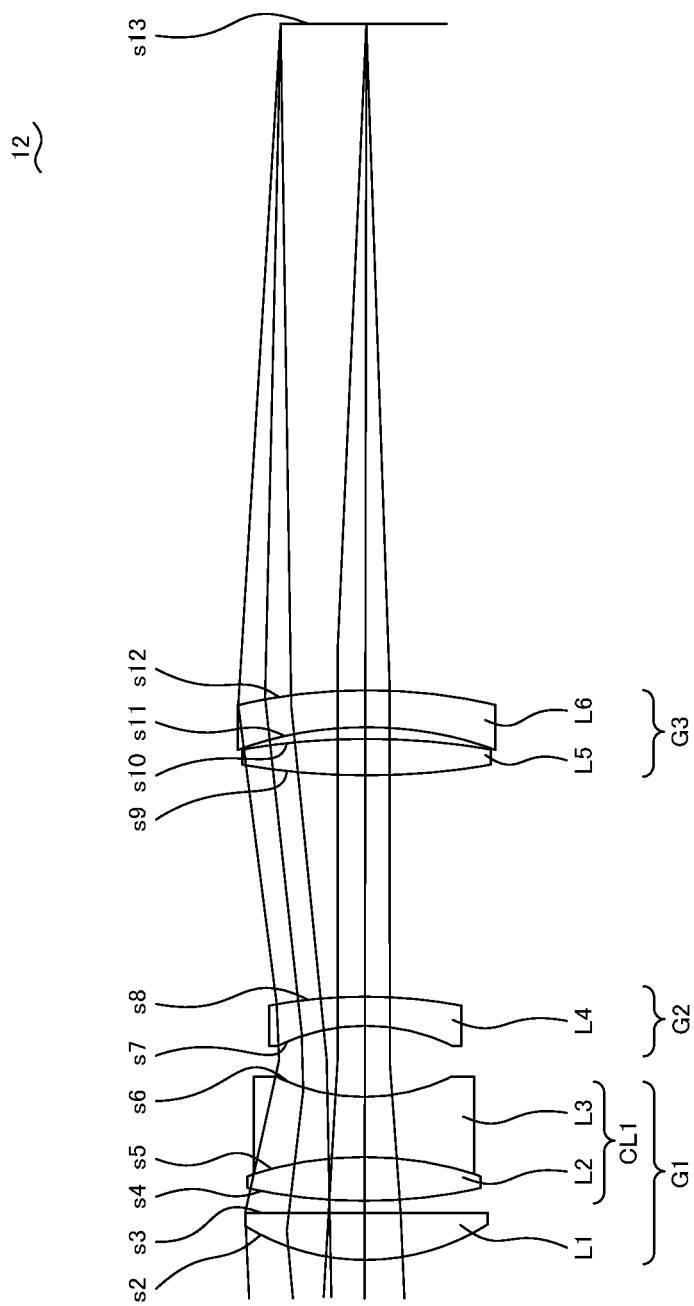
FIG. 2 is a cross-sectional diagram of a tube lens according to embodiment 1 of the present invention.

FIG. 2 is a cross-sectional diagram of a tube lens according to the present embodiment. A tube lens 12 illustrated in FIG. 2 is a tube lens used in combination with an objective of the infinity correction type that enlarges the image of an object, and includes a first lens group G1 having a positive power including a cemented lens CL1 (a lens L2, a lens L3), a second lens group G2 having a negative power, and a third lens group G3 having a positive power as a whole including a positive lens (a lens L5) and a negative lens (a lens 6) in this order from the object side.

More specifically, the first lens group G1 includes a biconvex lens L1, and a cemented lens CL1 composed of a biconvex lens L2 and a biconcave lens L3, in this order from the object side. The second lens group G2 is composed of a meniscus lens L4 whose concave side faces the object side. The third lens group G3 includes a biconvex lens L5 and a meniscus lens L6 whose concave side faces the object side, in this order from the object side.

The first lens group G1 of the tube lens 12 includes the biconcave lens L3 as the lens whose concave side faces the image side, and the second lens group G2 includes the meniscus lens L4 as the lens whose concave side faces the object side.

Hereinafter, various data of the tube lens 12 according to the present embodiment are described. Meanwhile, the reference wavelength is the d line (587.56 nm).

The focal length FL of the tube lens 12, the focal length FLG1 of the first lens group, the focal length FLG2 of the second lens group, the numerical aperture on the image side NAI, and the image height IM.H are respectively as follows.

FL-180 mm, FL1G=145.28 mm, FLG2=82.98 mm, NAI=0.04, IM.H=15 mm

The lens data of the tube lens 12 according to the present embodiment are as follows.

tube lens 12

| s | r | d | nd | vd |
|---|---|---|---|---|
| 1 | INF | 162 | | |
| 2 | 40.155 | 9.67 | 1.497 | 81.54 |
| 3 | −328.499 | 1 | | |
| 4 | 88.849 | 8.63 | 1.48749 | 70.23 |
| 5 | −51.485 | 8.02 | 1.51633 | 64.14 |
| 6 | 31.708 | 13.631 | | |
| 7 | −29.997 | 4.3 | 1.65412 | 39.68 |
| 8 | −70.859 | 35.335 | | |
| 9 | 98.904 | 7.2 | 1.741 | 52.64 |
| 10 | −109.832 | 2.084 | | |
| 11 | −57.015 | 5.9 | 1.72151 | 29.23 |
| 12 | −91.13 | 109.232 | | |
| 13 (image surface) | INF | | | |

Here, s represents the surface number, r represents the radius of curvature (mm), d represents the surface distance (mm), rid represents the refraction index with respect to the d line, and vd represents the Abbe number. Meanwhile, the surface that the surface number, s1 indicates represents the surface at the exit pupil position of the objective (the entrance pupil position of the tube lens 12), and the surface that the surface number s13 indicates represents the image surface. Meanwhile, the surface distance d1 represents the distance from the surface that the surface number s1 indicates to the surface that the surface number s2 indicates, which is a distance D2 from the first surface being the lens surface of the tube lens 12 that is closest to the objective to the exit pupil position of the objective. The surface distance d12 represents the distance from the last surface of the tube lens 12 to the image surface.

The tube lens 12 according to the present embodiment satisfies the conditional expressions (1) through (9) as represented in expressions (11) through (19) below. The expressions (11) through (19) respectively correspond to the conditional expressions (1) through (9).

$$D2/FL=0.9 \tag{11}$$

$$FLG1/FL=0.807 \tag{12}$$

$$FLG2/FL=0.461 \tag{13}$$

$$D1/D0=0.467 \tag{14}$$

$$|RG2/RG1|=0.946 \tag{15}$$

$$NdG2=1.65412 \tag{16}$$

$$vdG1=81.540 \tag{17}$$

$$NdG3p=1.741 \tag{18}$$

$$vdG3n=29.23 \tag{19}$$

Figure 3:
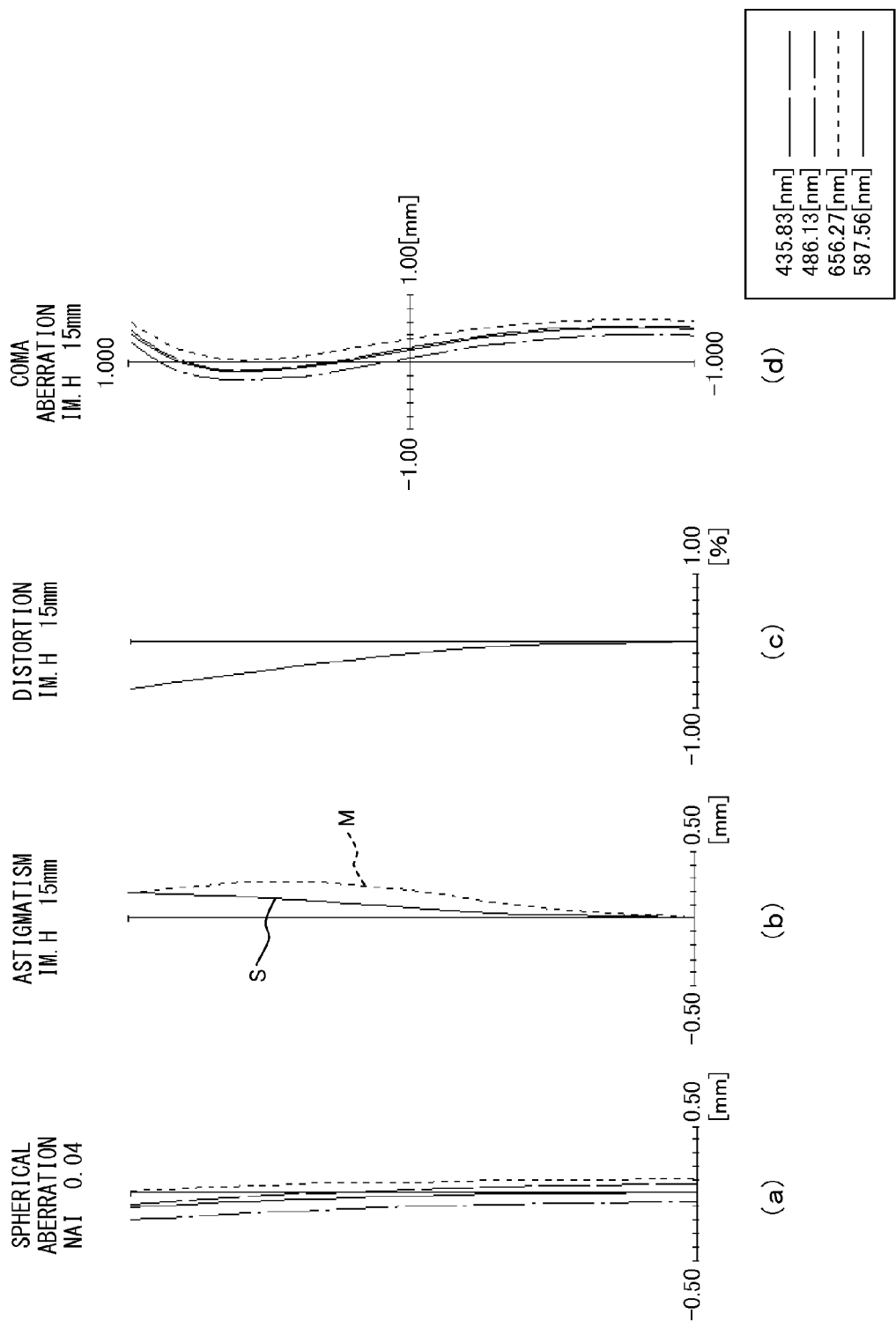
FIG. 3 is an aberration diagram of a tube lens illustrated in FIG. 2.

FIG. 3 is an aberration diagram of the tube lens illustrated in FIG. 2, representing aberration on the image surface in a case in which a parallel light flux falls on from the object side. FIG. 3(a) is a spherical aberration diagram, FIG. 3(b) is an astigmatism diagram, FIG. 3(c) is a distortion diagram, and FIG. 3(d) is a coma aberration diagram. They represent that all the aberrations are corrected in a good condition. Meanwhile, "NAI" in the drawing represents the numerical aperture on the image side of the tube lens 12, and "IM.H" represents the image height (mm). In addition, "M" represents the meridional component, and "S" represents the sagittal component.

<Embodiment 2>

Figure 4:
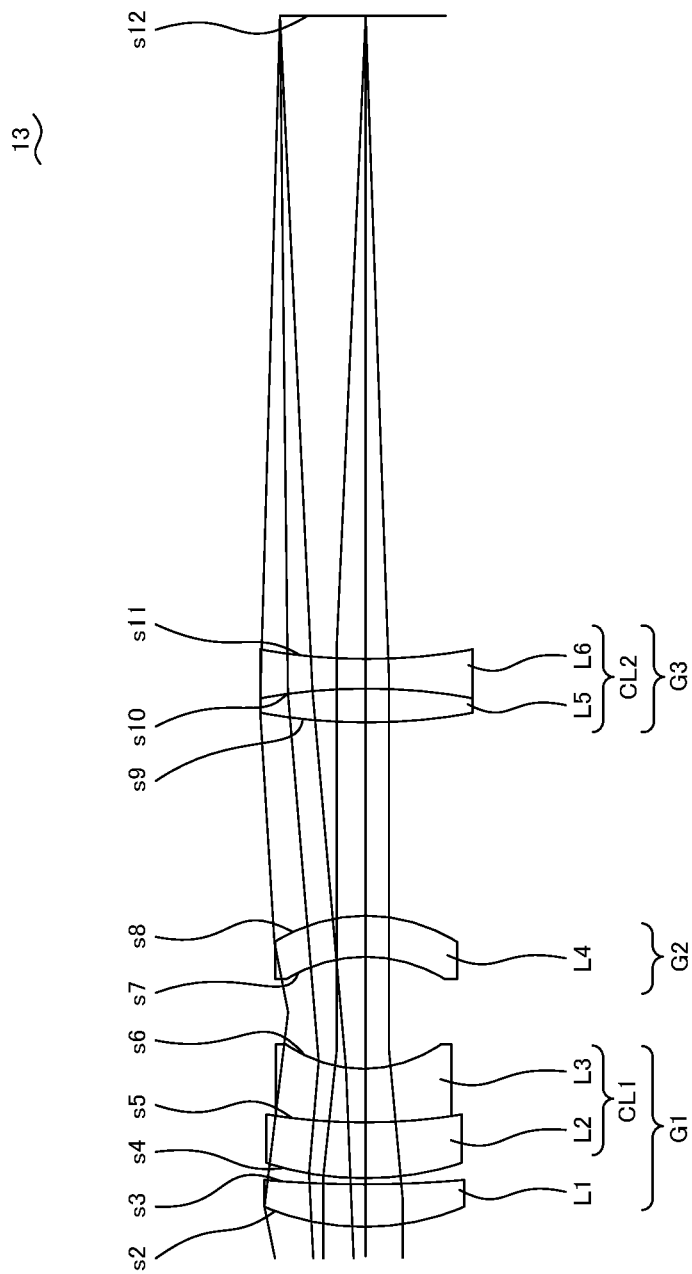
FIG. 4 is a cross-sectional diagram of a tube lens according to embodiment 2 of the present invention.

FIG. 4 is a cross-sectional diagram of a tube lens according to the present embodiment. A tube lens 13 illustrated in FIG. 4 is a tube lens used in combination with an objective of the infinity correction type that enlarges the image at an object, and includes a first lens group G1 having a positive power including a cemented lens CL1 (a lens L2, a lens L3), a second lens group G2 having a negative power, and a third lens group G3 having a positive power as a whole including a positive lens (a lens L5) and a negative lens (a lens 6) in this order from the object side.

More specifically, the first lens group G1 includes a meniscus lens L1 whose concave side faces the image side, and a cemented lens CL1 composed of a meniscus lens L2 whose concave side faces the image side and a meniscus lens L3 whose concave side faces the image side, in this order from the object side. The second lens group G2 is composed of a meniscus lens L4 whose concave side faces the object side.

The third lens group G3 includes a cemented lens CL2 composed of a biconvex lens L5 and a biconcave lens L6, in this order from the object side.

The first lens group G1 of the tube lens 13 includes the meniscus lens L3 as the lens whose concave side faces the image side, and the second lens group includes the meniscus lens L4 as the lens whose concave side faces the object side.

Hereinafter, various data of the tube lens 13 according to the present embodiment are described. Meanwhile, the reference wavelength is the d line (587.56 nm).

The focal length FL of the tube lens 13, the focal length FLG1 of the first lens group, the focal length FLG2 of the second lens group, the numerical aperture on the image side NAI, and the image height IM.H are respectively as follows.

FL=180 mm, FL1G=302.03 mm, FLG2=−714.22 mm, NAI=0.04, IM.H=15 mm

The lens data of the tube lens 13 according to the present embodiment are as follows.

tube lens 13

| s | r | d | nd | vd |
|---|---|---|---|---|
| 1 | INF | 112 | | |
| 2 | 46.801 | 7 | 1.497 | 81.54 |
| 3 | 335.831 | 1 | | |
| 4 | 55.814 | 9.32 | 1.48749 | 70.23 |
| 5 | 97.109 | 9.3 | 1.6134 | 44.27 |
| 6 | 29.264 | 17.663 | | |
| 7 | −27.917 | 6.5 | 1.65412 | 39.68 |
| 8 | −32.425 | 31.625 | | |
| 9 | 80 | 6.1 | 1.7859 | 44.2 |
| 10 | −109.972 | 5 | 1.64769 | 33.79 |
| 11 | 103.327 | 106.404 | | |
| 12 (image surface) | INF | | | |

Here, s represents the surface number, r represents the radius of curvature (mm), d represents the surface distance (mm), nd represents the refraction index with respect to the d line, and vd represents the Abbe number. Meanwhile, the surface that the surface number s1 indicates represents the surface at the exit pupil position of the objective (the entrance pupil position of the tube lens 13), and the surface that the surface number s12 indicates represents the image surface. Meanwhile, the surface distance d1 represents the distance from the surface that the surface number s1 indicates to the surface that the surface number s2 indicates, which is a distance D2 from the first surface being the lens surface of the tube lens 13 that is closest to the objective to the exit pupil position of the objective. The surface distance d11 represents the distance from the last surface of the tube lens 13 to the image surface.

The tube lens 13 according to the present embodiment satisfies the conditional expressions (1) through (9) as represented in expressions (21) through (29) below. The expressions (21) through (29) respectively correspond to the conditional expressions (1) through (9).

$$D2/FL=0.622 \tag{21}$$

$$FLG1/FL=1.678 \tag{22}$$

$$FLG2/FL=-3.968 \tag{23}$$

$$D1/D0=0.468 \tag{24}$$

$$|RG2/RG1|=0.954 \tag{25}$$

$$NdG2=1.65412 \tag{26}$$

$$vdG1=81.540 \tag{27}$$

$$NdG3p=1.7859 \tag{28}$$

$$vdG3n=33.79 \tag{29}$$

Figure 5:
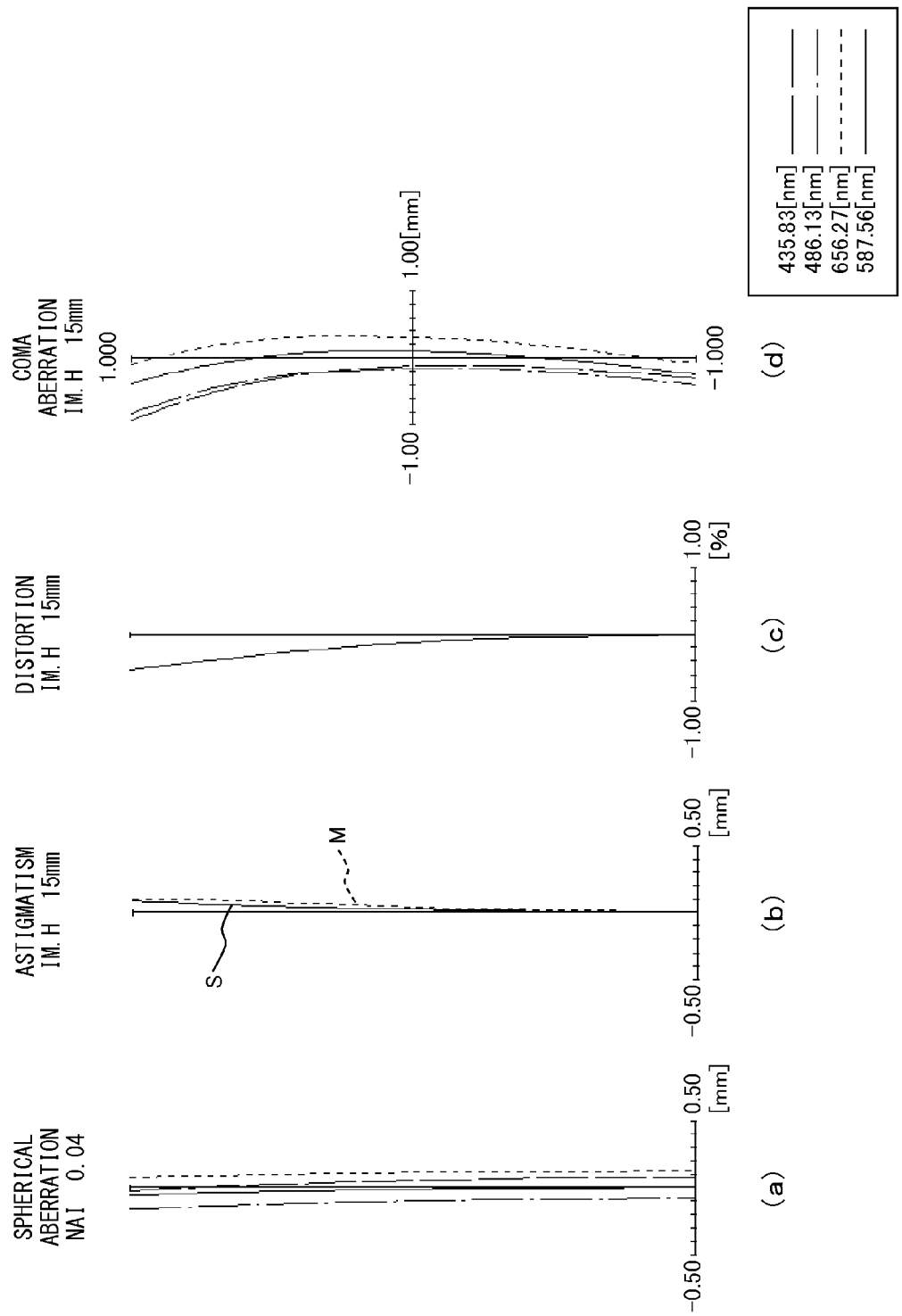
FIG. 5 is an aberration diagram of a tube lens illustrated in FIG. 4.

FIG. 5 is an aberration diagram of the tube lens illustrated in FIG. 4, representing aberration on the image surface in a case in which a parallel light flux falls on from the object side. FIG. 5(a) is a spherical aberration diagram, FIG. 5(b) is an astigmatism diagram, FIG. 5(c) is a distortion diagram, and FIG. 5(d) is a coma aberration diagram. They represent that all the aberrations are corrected in a good condition. Meanwhile, "NAI" in the drawing represents the numerical aperture on the image side of the tube lens 13, and "IM.H" represents the image height (mm). In addition, "M" represents the meridional component, and "S" represents the sagittal component.

<Embodiment 3>

Figure 6:
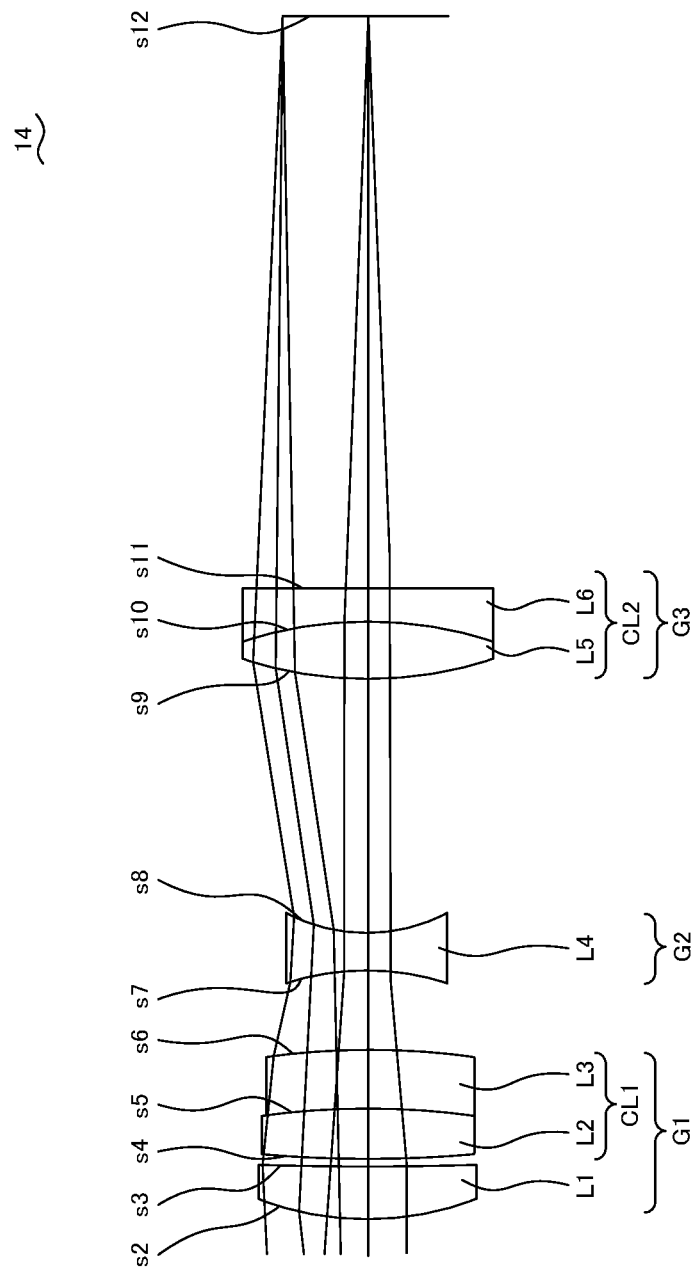
FIG. 6 is a cross-sectional diagram according to embodiment 3 of the present invention.

FIG. 6 is a cross-sectional diagram of a tube lens according to the present embodiment. A tube lens 14 illustrated in FIG. 6 is a tube lens used in combination with an objective of the infinity correction type that enlarges the image of an object, and includes a first lens group G1 having a positive power including a cemented lens CL1 (a lens L2, a lens L3), a second lens group G2 having a negative power, and a third lens group G3 having a positive power as a whole including a positive lens (a lens L5) and a negative lens (a lens 6) in this order from the object side.

More specifically, the first lens group G1 includes a meniscus lens L1 whose concave side faces the image side, and a cemented lens CL1 composed of a biconvex lens L2 and a meniscus lens L3 whose concave side faces the object side, in this order from the object side. The second lens group G2 is composed of a biconcave lens L4. The third lens group G3 includes a cemented lens CL2 composed of a biconvex lens L5 and a meniscus lens L6 whose concave side faces the object side, in this order from the object side.

The first lens group G1 of the tube lens 14 includes the meniscus lens L1 as the lens whose concave side faces the image side, and the second lens group includes the biconcave lens L4 as the lens whose concave side faces the object side.

Hereinafter, various data of the tube lens 14 according to the present embodiment are described. Meanwhile, the reference wavelength is the d line (587.56 nm).

The focal length FL of the tube lens 14, the focal length FLG1 of the first lens group, the focal length FLG2 of the second lens group, the numerical aperture on the image side NAI, and the image height IM.H are respectively as follows.

FL-180 mm, FL1G=64.74 mm, FLG2=−34.7 mm, NAI=0.04, IM.H=15 mm

The lens data of the tube lens 14 according to the present embodiment are as follows.

tube lens 14

| s | r | d | nd | vd |
|---|---|---|---|---|
| 1 | INF | 143 | | |
| 2 | 45.074 | 8.75 | 1.48749 | 70.23 |
| 3 | 434.785 | 1 | | |
| 4 | 121.956 | 8.65 | 1.497 | 81.54 |
| 5 | −103.036 | 9.5 | 1.788 | 47.37 |
| 6 | −144.577 | 13.007 | | |
| 7 | −56.522 | 6.68 | 1.6134 | 44.27 |
| 8 | 35.668 | 41.99 | | |

-continued tube lens 14

| s | r | d | nd | vd |
|---|---|---|---|---|
| 9 | 82.23 | 8.86 | 1.7859 | 44.2 |
| 10 | −90.131 | 5.95 | 1.74 | 28.3 |
| 11 | −1494.184 | 94.17 | | |
| 12 (image surface) | INF | | | |

Here, s represents the surface number, r represents the radius of curvature (mm), d represents the surface distance (mm), nd represents the refraction index with respect to the d line, and vd represents the Abbe number. Meanwhile, the surface that the surface number s1 indicates represents the surface at the exit pupil position of the objective (the entrance pupil position of the tube lens 14), and the surface that the surface number s12 indicates represents the image surface. Meanwhile, the surface distance d1 represents the distance from the surface that the surface number s1 indicates to the surface that the surface number s2 indicates, which is a distance 32 from the first surface being the lens surface of the tube lens 14 that is closest to the objective to the exit pupil, position of the objective. The surface distance d11 represents the distance from the last surface of the tube lens 14 to the image surface.

The tube lens 14 according to the present embodiment satisfies the conditional expressions (1) through (9) as represented in expressions (31) through (39) below. The expressions (31) through (39) respectively correspond to the conditional expressions (1) through (9).

$$D2/FL=0.794 \quad (31)$$

$$FLG1/FL=0.360 \quad (32)$$

$$FLG2/FL=-0.193 \quad (33)$$

$$D1/D0=0.525 \quad (34)$$

$$|RG2/RG1|=0.130 \quad (35)$$

$$NdG2=1.6134 \quad (36)$$

$$vdG1=81.540 \quad (37)$$

$$NdG3p=1.7859 \quad (38)$$

$$vdG3n=28.3 \quad (39)$$

Figure 7:
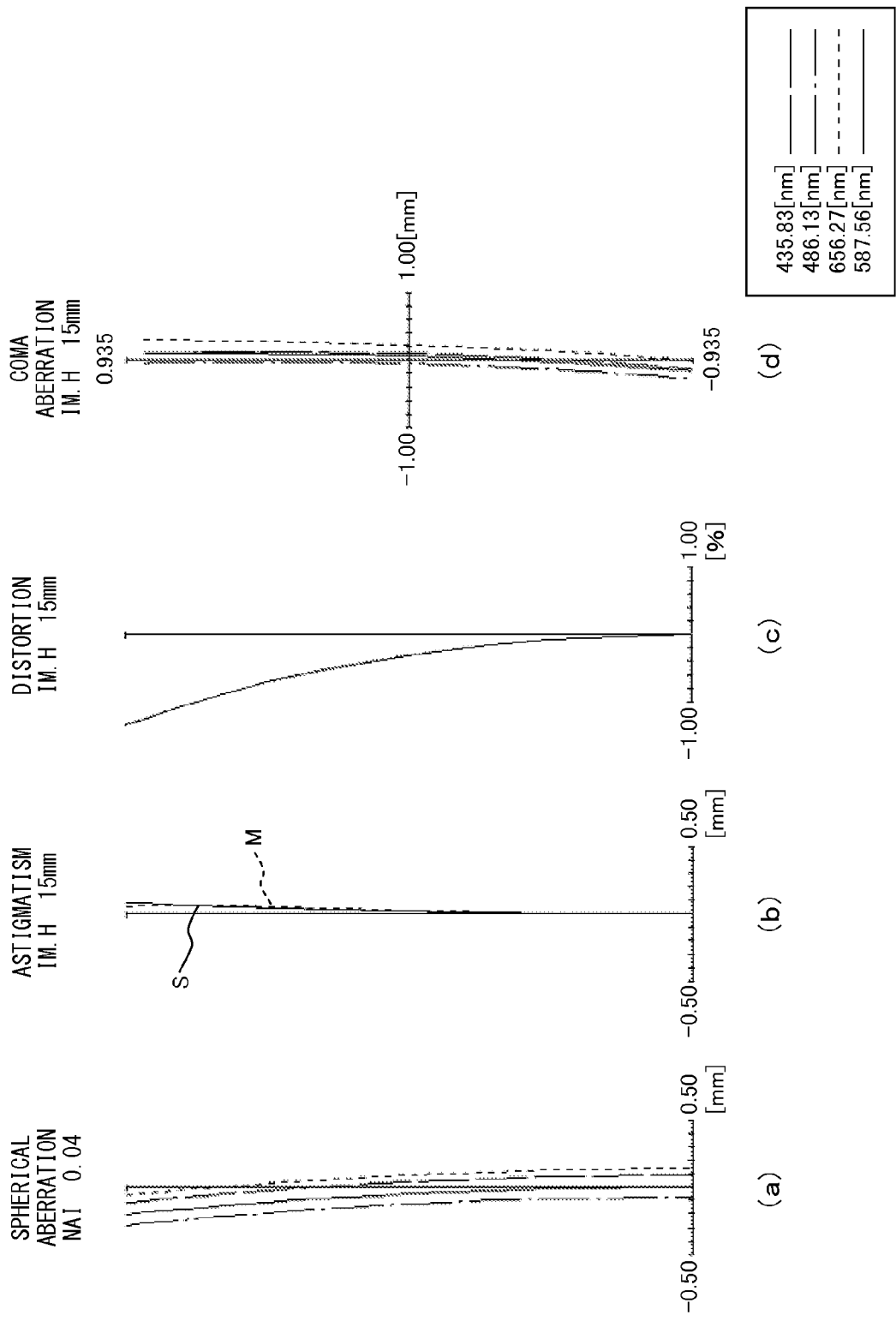
FIG. 7 is an aberration diagram of a tube lens illustrated in FIG. 6.

FIG. 7 is an aberration diagram of the tube lens illustrated in FIG. 6, representing aberration on the image surface in a case in which a parallel light flux falls on from the object side. FIG. 7(a) is a spherical aberration diagram, FIG. 7(b) is an astigmatism diagram, FIG. 7(c) is a distortion diagram, and FIG. 7(d) is a coma aberration diagram. They represent that all the aberrations are corrected in a good condition. Meanwhile, "NAI" in the drawing represents the numerical aperture on the image side of the tube lens 14, and "IM.H" represents the image height (mm). In addition, "M" represents the meridional component, and "S" represents the sagittal component.

<Embodiment 4>

Figure 8:
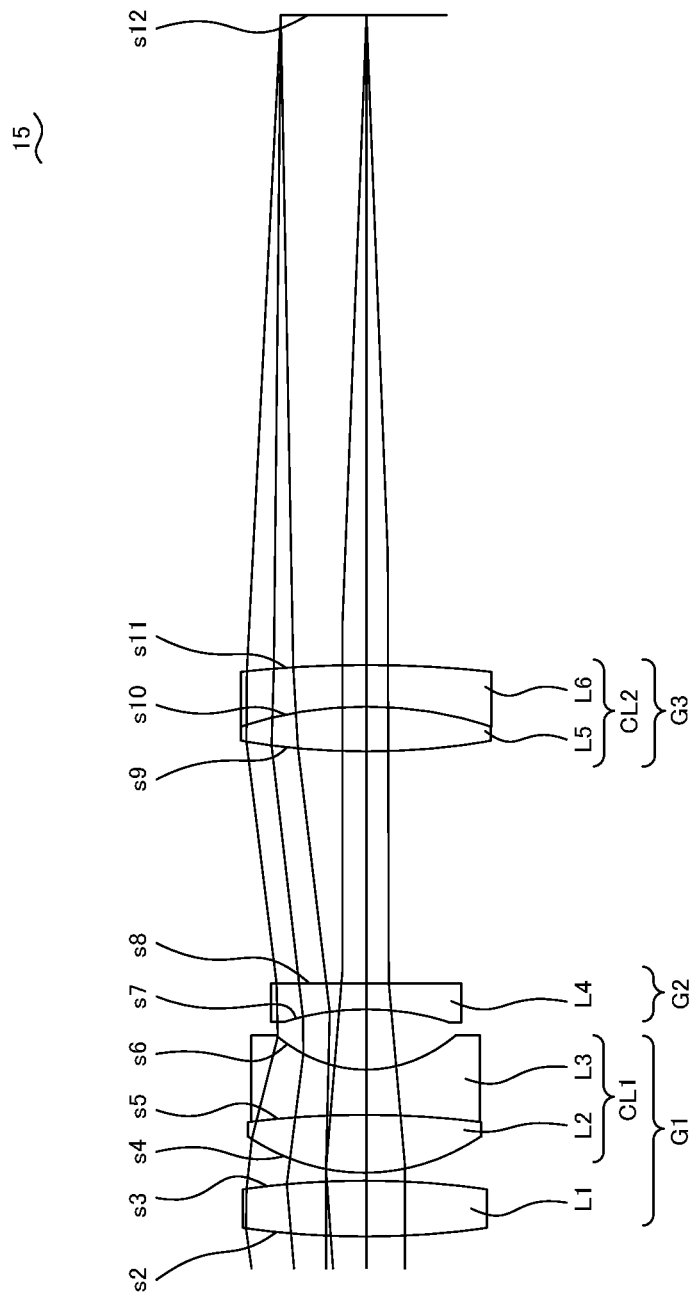
FIG. 8 is a cross-sectional diagram of a tube lens according to embodiment 4 of the present invention.

FIG. 8 is a cross-sectional diagram of a tube lens according to the present embodiment. A tube lens 15 illustrated in FIG. 8 is a tube lens used in combination with an objective of the infinity correction type that enlarges the image of an object, and includes a first lens group G1 having a positive power including a cemented lens CL1 (a lens L2, a lens L3), a second lens group G2 having a negative power, and a third lens group G3 having a positive power as a whole including a positive lens (a lens L5) and a negative lens (a lens 6) in this order from the object side.

More specifically, the first lens group G1 includes a biconvex lens L1, and a cemented lens CL1 composed of a biconvex L2 and a biconcave lens L3, in this order from the object side. The second lens group G2 is composed of a meniscus lens L4 whose concave side faces the object side. The third lens group G3 includes a cemented lens CL2 composed of a biconvex lens L5 and a meniscus lens L6 whose concave side faces the object side, in this order from the object side.

The first lens group G1 of the tube lens 15 includes the biconcave lens L3 as the lens whose concave side faces the image side, and the second lens group includes the meniscus lens L4 as the lens whose concave side faces the object side.

Hereinafter, various data of the tube lens 15 according to the present embodiment are described. Meanwhile, the reference wavelength is the d line (587.56 nm).

The focal length FL of the tube lens 15, the focal length FLG1 of the first lens group, the focal length FLG2 of the second lens group, the numerical aperture on the image side NAI, and the image height IM.H are respectively as follows.

FL=180 mm, FL1G=130.92 mm, FLG2=89.66 mm, NAI=0.04, IM.H=15 mm

The lens data of the tube lens 15 according to the present embodiment are as follows.

tube lens 15

| s | r | d | nd | vd |
|---|---|---|---|---|
| 1 | INF | 162 | | |
| 2 | 116.972 | 10 | 1.48749 | 70.23 |
| 3 | −118.186 | 1 | | |
| 4 | 36.021 | 9.42 | 1.497 | 81.54 |
| 5 | −192.959 | 8 | 1.51633 | 64.14 |
| 6 | 26.873 | 9.424 | | |
| 7 | −56.018 | 4.54 | 1.65412 | 39.68 |
| 8 | −1290.068 | 38.518 | | |
| 9 | 165.079 | 6.76 | 1.7725 | 49.6 |
| 10 | −90.99 | 7.23 | 1.71736 | 29.52 |
| 11 | −237.346 | 107.572 | | |
| 12 (image surface) | INF | | | |

Here, s represents the surface number, r represents the radius of curvature (mm), d represents the surface distance (mm), nd represents the refraction index with respect to the d line, and vd represents the Abbe number. Meanwhile, the surface that the surface number s1 indicates represents the surface at the exit pupil position of the objective (the entrance pupil position of the tube lens 15), and the surface that the surface number s12 indicates represents the image surface. Meanwhile, the surface distance d1 represents the distance from the surface that the surface number s1 indicates to the surface that the surface number s2 indicates, which is a distance D2 from the first surface being the lens surface of the tube lens 15 that is closest to the objective to the exit pupil position of the objective. The surface distance d11 represents the distance from the last surface of the tube lens 15 to the image surface.

The tube lens 15 according to the present embodiment satisfies the conditional expressions (1) through (9) as represented in expressions (41) through (49) below. The expressions (41) through (49) respectively correspond to the conditional expressions (1) through (9).

$D2/FL=0.9$ (41)

$FLG1/FL=0.727$ (42)

$FLG2/FL=-0.498$ (43)

$D1/D0=0.469$ (44)

$|RG2/RG1|=2.085$ (45)

$NdG2=1.65412$ (46)

$vdG1=81.540$ (47)

$NdG3p=1.7725$ (48)

$vdG3n=29.52$ (49)

Figure 9:
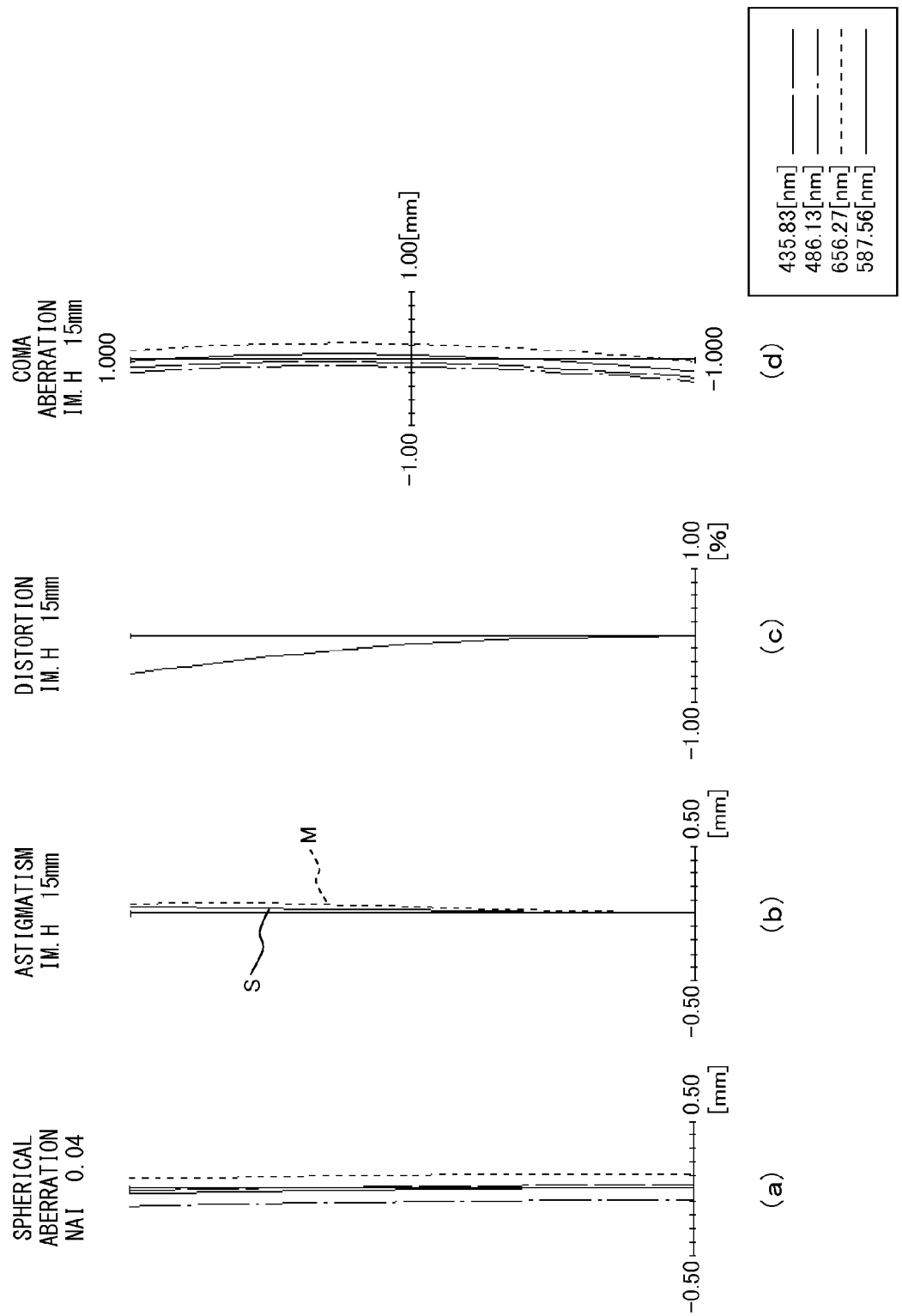
FIG. 9 is an aberration diagram of a tube lens illustrated in FIG. 8.

FIG. 9 is an aberration diagram of the tube lens illustrated in FIG. 8, representing aberration on the image surface in a case in which a parallel light flux falls on from the object side. FIG. 9(a) is a spherical aberration diagram, FIG. 9(b) is an astigmatism diagram, FIG. 9(c) is a distortion diagram, and FIG. 9(d) is a coma aberration diagram. They represent that all the aberrations are corrected in a good condition. Meanwhile, "NAI" in the drawing represents the numerical aperture on the image side of the tube lens 15, and "IM.H" represents the image height (mm). In addition, "M" represents the meridional component, and "S" represents the sagittal component.

<Embodiment 5>

Figure 10:
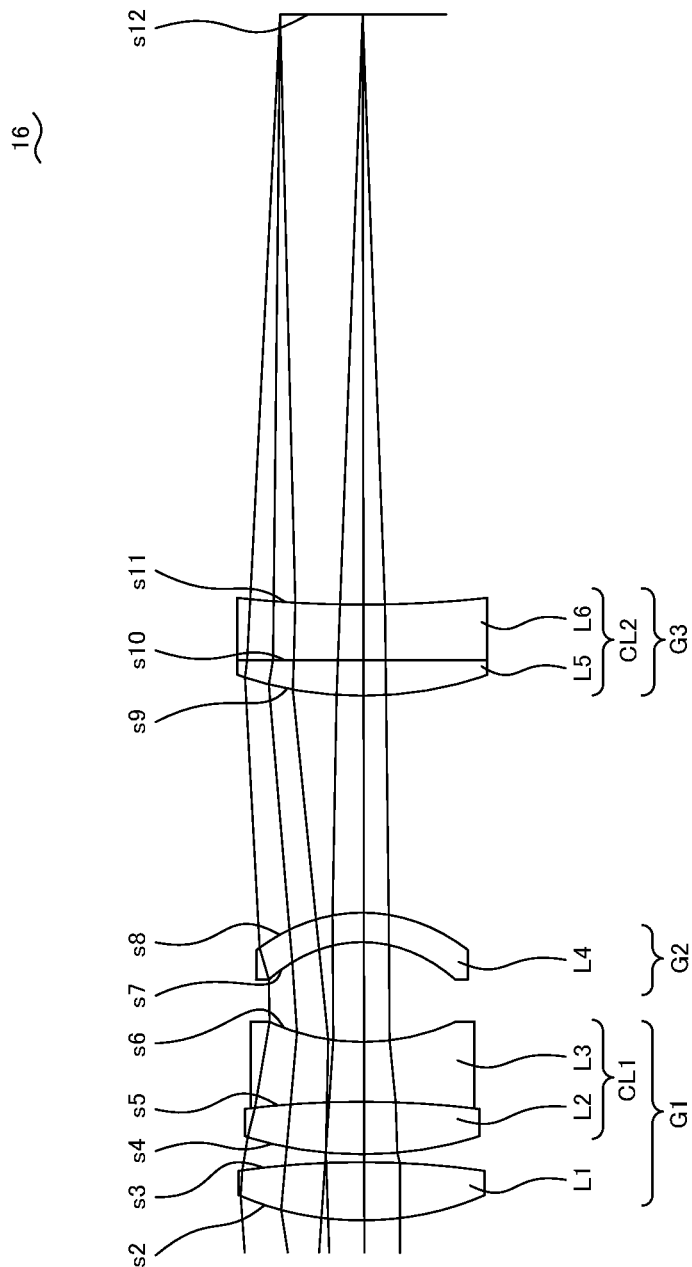
FIG. 10 is a cross-sectional diagram according to embodiment 5 of the present invention.

FIG. 10 is a cross-sectional diagram of a tube lens according to the present embodiment. A tube lens 16 illustrated in FIG. 10 is a tube lens used in combination with an objective of the infinity correction type that enlarges the image of an object, and includes a first lens group G1 having a positive power including a cemented lens CL1 (a lens L2, a lens L3), a second lens group G2 having a negative power, and a third lens group G3 having a positive power as a whole including a positive lens (a lens L5) and a negative lens (a lens 6) in this order from the object side.

More specifically, the first lens group G1 includes a biconvex lens L1, and a cemented lens CL1 composed of a biconvex L2 and a biconcave lens L3, in this order from the object side. The second lens group G2 is composed of a meniscus lens L4 whose concave side faces the object side. The third lens group G3 includes a cemented lens CL2 composed of a planoconvex lens L5 whose convex side faces the object side and a planoconcave lens L6 whose concave, side faces the image side, in this order from the object side.

The first lens group G1 of the tube lens 16 includes the biconcave lens L3 as the lens whose concave side faces the image side, and the second lens group includes the meniscus lens L4 as the lens whose concave side faces the object side.

Hereinafter, various data of the tube lens 16 according to the present embodiment are described. Meanwhile, the reference wavelength is the d line (587.56 nm).

The focal length FL of the tube lens 16, the focal length FLG1 of the first lens group, the focal length FLG2 of the second lens group, the numerical aperture on the image side NAI, and the image height IM.H are respectively as follows.

FL=180 mm, FL1G=272.16 mm, FLG2=−580.95 mm, NAI=0.04, IM.H=15 mm

The lens data of the tube lens 16 according to the present embodiment are as follows.

| tube lens 16 | | | | |
|---|---|---|---|---|
| s | r | d | nd | vd |
| 1 | INF | 162 | | |
| 2 | 52.686 | 9.9 | 1.48749 | 70.23 |
| 3 | −212.258 | 1 | | |
| 4 | 65.191 | 8.9 | 1.497 | 81.54 |
| 5 | −215.971 | 9.6 | 1.741 | 52.64 |
| 6 | 38.465 | 17.03 | | |
| 7 | −25.776 | 4.9 | 1.6134 | 44.27 |
| 8 | −29.794 | 35.716 | | |
| 9 | 77.248 | 5.8 | 1.72916 | 54.68 |
| 10 | INF | 9 | 1.68893 | 31.07 |
| 11 | 147.437 | 97.453 | | |
| 12 (image surface) | INF | | | |

Here, s represents the surface number, r represents the radius of curvature (mm), d represents the surface distance (mm), nd represents the refraction index with respect to the d line, and vd represents the Abbe number. Meanwhile, the surface that the surface number s1 indicates represents the surface at the exit pupil position of the objective (the entrance pupil position of the tube lens 16), and the surface that the surface number s12 indicates represents the image surface. Meanwhile, the surface distance d1 represents the distance from the surface that the surface number s1 indicates to the surface that the surface number s2 indicates, which is a distance D2 from the first surface being the lens surface of the tube lens 16 that is closest to the objective to the exit pupil position of the objective. The surface distance d11 represents the distance from the last surface of the tube lens 16 to the image surface.

The tube lens 16 according to the present embodiment satisfies the conditional expressions (1) through (9) as represented in expressions (51) through (59) below. The expressions (51) through (59) respectively correspond to the conditional expressions (1) through (9).

$D2/FL=0.9$ (51)

$FLG1/FL=1.512$ (52)

$FLG2/FL=3.228$ (53)

$D1/D0=0.511$ (54)

$|RG2/RG1|=0.670$ (55)

$NdG2=1.6134$ (56)

$vdG1=81.540$ (57)

$NdG3p=1.72916$ (58)

$vdG3n=31.07$ (59)

Figure 11:
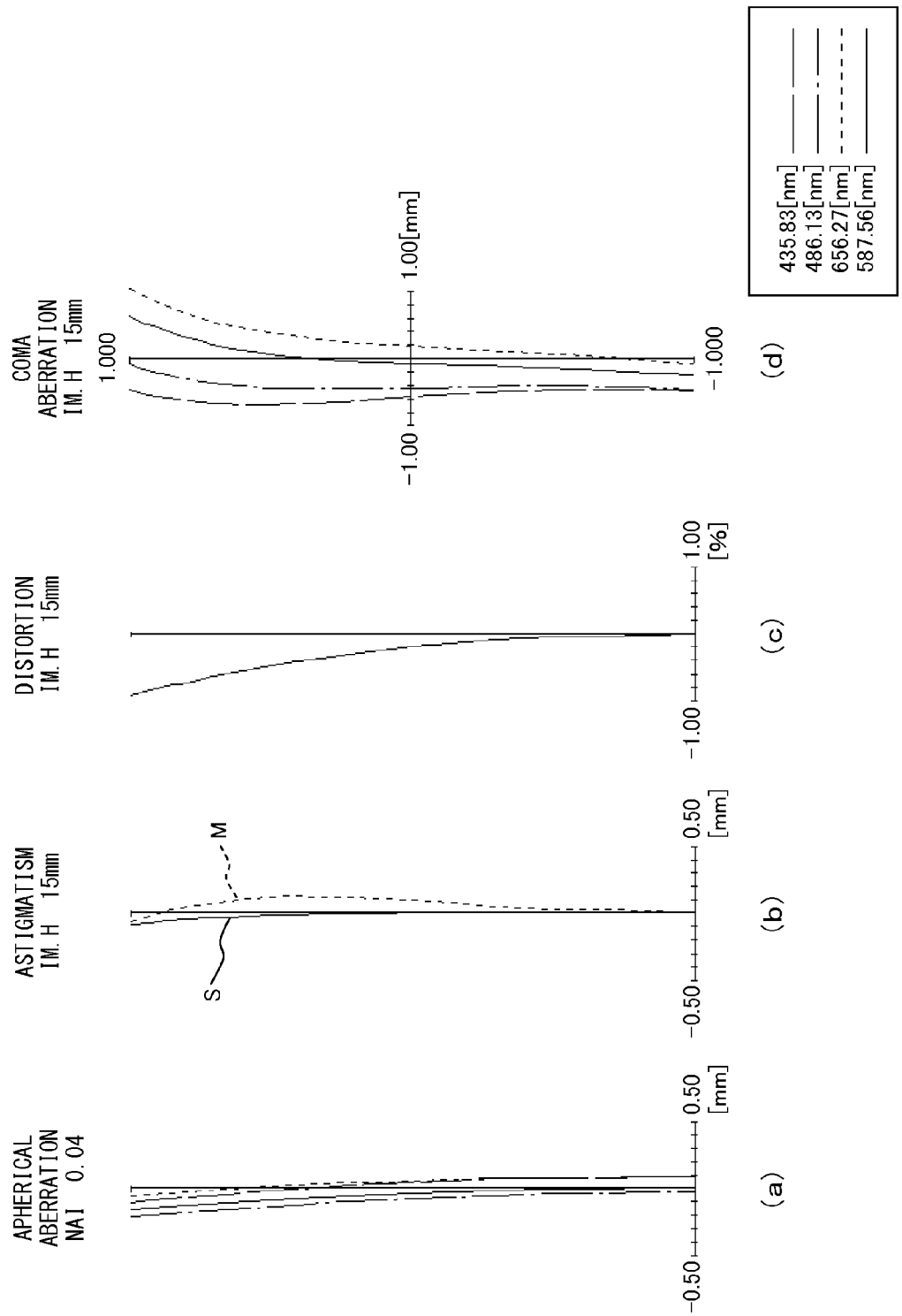
FIG. 11 is an aberration diagram of a tube lens illustrated in FIG. 10.

FIG. 11 is an aberration diagram of the tube lens illustrated in FIG. 10, representing aberration on the image surface in a case in which a parallel light flux falls on from the object side. FIG. 11(a) is a spherical aberration diagram, FIG. 11(b) is an astigmatism diagram, FIG. 11(c) is a distortion diagram, and FIG. 11(d) is a coma aberration diagram. They represent that all the aberrations are corrected in a good condition. Meanwhile, "NAI" in the drawing represents the numerical aperture on the image side of the tube lens 16, and "IM.H" represents the image height (mm). In addition, "M" represents the meridional component, and "S" represents the sagittal component.

<Embodiment 6>

Figure 12:
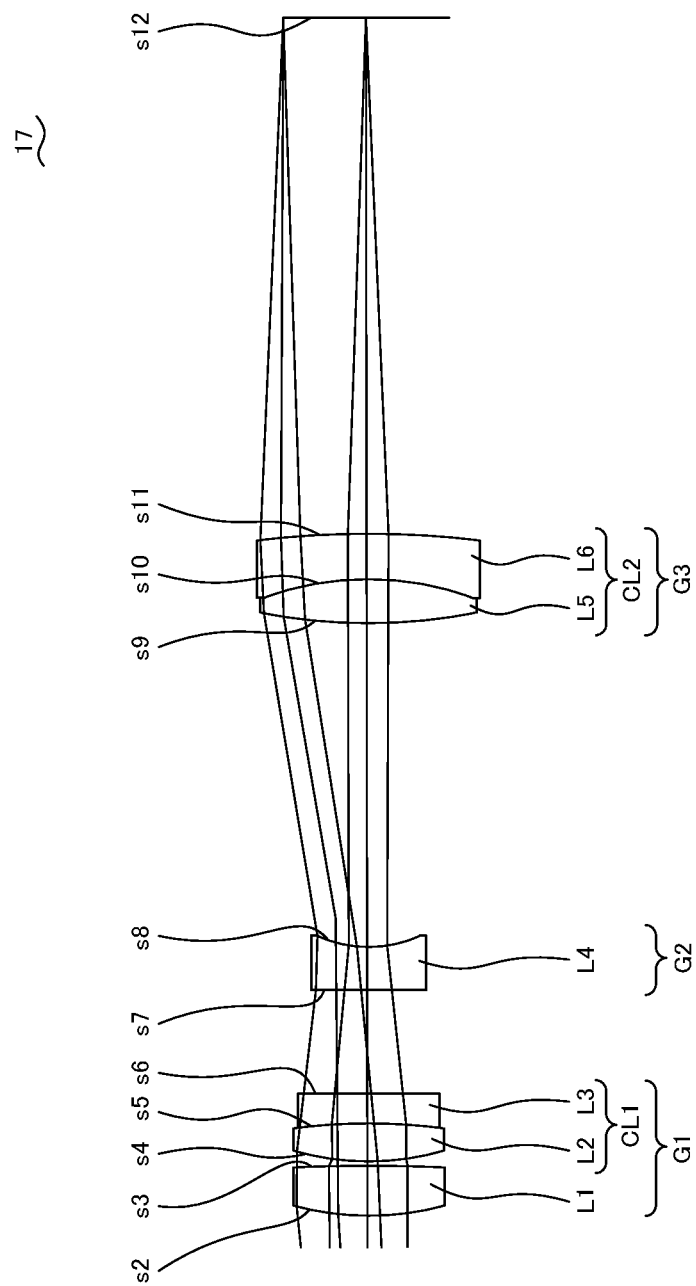
FIG. 12 is a cross-sectional diagram according to embodiment 6 of the present invention.

FIG. 12 is a cross-sectional diagram of a tube lens according to the present embodiment. A tube lens 17 illustrated in FIG. 12 is a tube lens used in combination with an objective of the infinity correction type that enlarges the image of an object, and includes a first lens group G1 having a positive power including a cemented lens CL1 (a lens L2, a lens L3), a second lens group G2 having a negative power, and a third lens group G3 having a positive power as a whole including a positive lens (a lens L5) and a negative lens (a lens 6) in this order from the object side.

More specifically, the first lens group G1 includes a meniscus lens L1 whose concave side faces the image side, and a cemented lens CL1 composed of a biconvex L2 and a biconcave lens L3, in this order from the object side. The second lens group G2 is composed of a biconcave lens L4. The third lens group G3 includes a cemented lens CL2 composed of a biconvex lens L5 and a meniscus lens L6 whose concave side faces the object side, in this order from the object side.

The first lens group G1 of the tube lens 17 includes the biconcave lens L3 as the lens whose concave side faces the image side, and the second lens group includes the biconcave lens L4 as the lens whose concave side faces the object side.

Hereinafter, various data of the tube lens 17 according to the present embodiment are described. Meanwhile, the reference wavelength is the d line (587.56 nm).

The focal length FL of the tube lens 17, the focal length FLG1 of the first lens group, the focal length FLG2 of the second lens group, the numerical aperture on the image side NAI, and the image height IM.H are respectively as follows.

FL=180 mm, FL1G=64.75 mm, FLG2=−31.53
NAI=0.04, IM.H=15 mm

The lens data of the tube lens 17 according to the present embodiment are as follows.

tube lens 17

| s | r | d | nd | vd |
|---|---|---|---|---|
| 1 | 49.775 | 62 | 1.497 | 81.54 |
| 2 | 609.447 | 8 | | |
| 3 | 58.344 | 1 | 1.497 | 81.54 |
| 4 | −94.097 | 6.28 | 1.51633 | 64.14 |
| 5 | 266.824 | 4.5 | | |
| 6 | −139.859 | 17.412 | 1.83481 | 42.71 |
| 7 | 33.611 | 7.5 | | |
| 8 | 115.912 | 53.282 | 1.8061 | 40.92 |
| 9 | −60.321 | 7 | 1.78472 | 25.68 |
| 10 | −184.927 | 7.5 | | |
| 11 | INF | 85.554 | | |
| 12 (image surface) | INF | | | |

Here, s represents the surface number, r represents the radius of curvature (mm), d represents the surface distance (mm), nd represents the refraction index with respect to the d line, and vd represents the Abbe number. Meanwhile, the surface that the surface number s1 indicates represents the surface at the exit pupil position of the objective (the entrance pupil position of the tube lens 17), and the surface that the surface number s12 indicates represents the image surface. Meanwhile, the surface distance d1 represents the distance from the surface that the surface number s1 indicates to the surface that the surface number s2 indicates, which is a distance D2 from the first surface being the lens surface of the tube lens 17 that is closest to the objective to the exit pupil position of the objective. The surface distance d11 represents the distance from the last surface of the tube lens 17 to the image surface.

The tube lens 17 according to the present embodiment satisfies the conditional expressions (1) through (9) as represented in expressions (61) through (69) below. The expressions (61) through (69) respectively correspond to the conditional expressions (1) through (9).

$$D2/FL = 0.344 \quad (61)$$

$$FLG1/FL = 0.360 \quad (62)$$

$$FLG2/FL = -0.177 \quad (63)$$

$$D1/D0 = 0.568 \quad (64)$$

$$|RG2/RG1| = 0.524 \quad (65)$$

$$NdG2 = 1.83481 \quad (66)$$

$$vdG1 = 81.540 \quad (67)$$

$$NdG3p = 1.8061 \quad (68)$$

$$vdG3n = 25.68 \quad (69)$$

Figure 13:
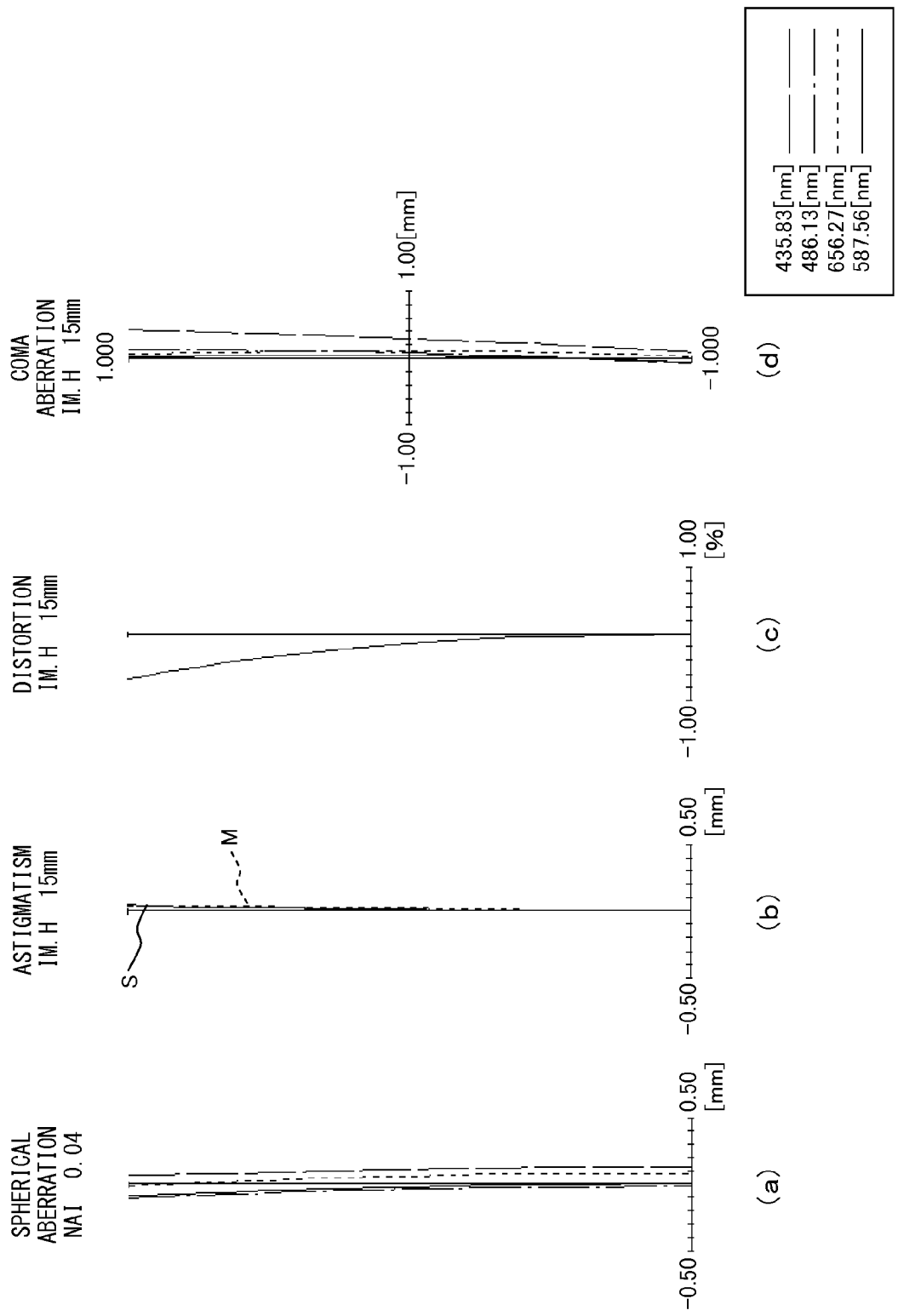
FIG. 13 is an aberration diagram of a tube lens illustrated in FIG. 12.

FIG. 13 is an aberration diagram of the tube lens illustrated in FIG. 12, representing aberration on the image surface in a case in which a parallel light flux falls on from the object side. FIG. 13(a) is spherical aberration diagram, FIG. 13(b) is an astigmatism diagram, FIG. 13(c) is a distortion diagram, and FIG. 13(d) is a coma aberration diagram. They represent that all the aberrations are corrected in a good condition. Meanwhile, "NAI" in the drawing represents the numerical aperture on the image side of the tube lens 17, and "IM.H" represents the image height (mm). In addition, "M" represents the meridional component, and "S" represents the sagittal component.

<Embodiment 7>

Figure 14:
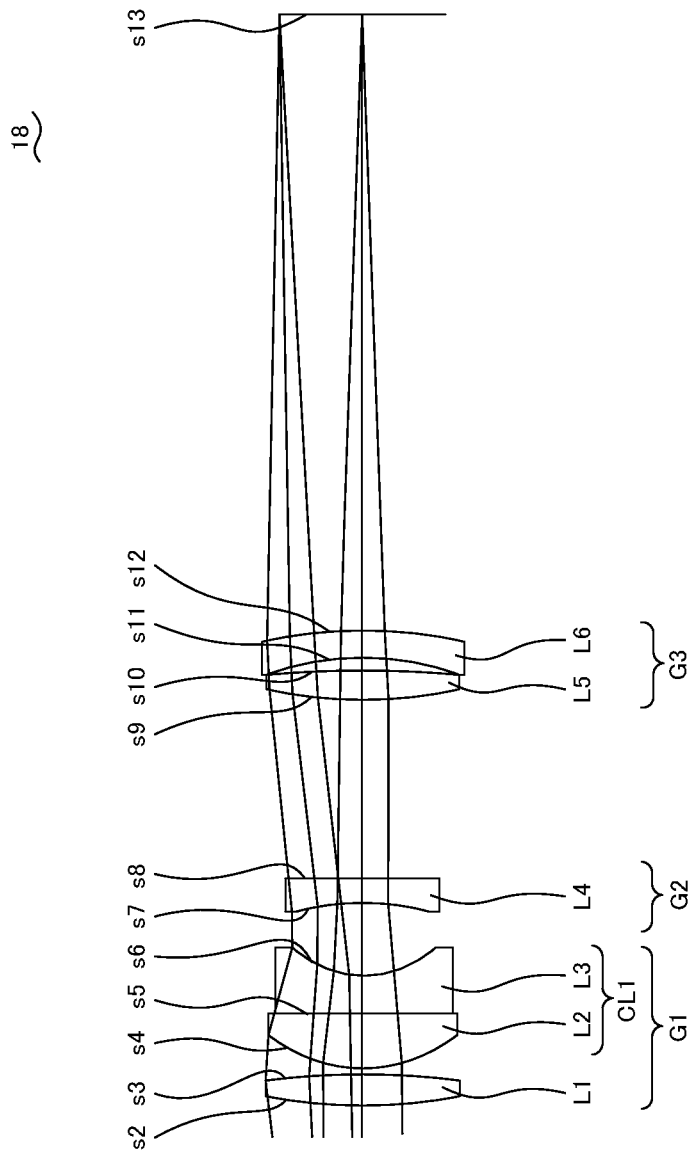
FIG. 14 is a cross-sectional diagram according to embodiment 7 of the present invention.

FIG. 14 is a cross-sectional diagram of a tube lens according to the present embodiment. A tube lens 18 illustrated in FIG. 14 is a tube lens used in combination with an objective of the infinity correction type that enlarges the image of an object, and includes a first lens group G1 having a positive power including a cemented lens CL1 (a lens L2, a lens L3), a second lens group G2 having a negative power, and a third lens group G3 having a positive power as a whole including a positive lens (a lens L5) and a negative lens (a lens 6) in this order from the object side.

More specifically, the first: lens group G1 includes a biconvex lens L1, and a cemented lens CL1 composed of a planoconvex lens L2 whose convex side faces the object side and a planoconcave lens L3 whose concave side faces the image side, in this order from the object side. The second lens group G2 is composed of a planoconcave lens L4 whose concave side faces the object side. The third lens group G3 includes a biconvex lens L5 and a meniscus lens L6 whose concave side faces the object side, in this order from the object side.

The first lens group G1 of the tube lens 18 includes the planoconcave lens L3 as the lens whose concave side faces the image side, and the second lens group includes the planoconcave lens L4 as the lens whose concave side faces the object side.

Hereinafter, various data of the tube lens 18 according to the present embodiment are described. Meanwhile, the reference wavelength is the d line (587.56 nm).

The focal length FL of the tube lens 18, the focal length FLG1 of the first lens group, the focal length FLG2 of the second lens group, the numerical aperture on the image side NAI, and the image height IM.H are respectively as follows.

FL=180 mm, FLG1=125.24 mm, FLG2=−86.26 mm, NAI=0.04, IM.H=15 mm

The lens data of the tube lens 18 according to the present embodiment are as follows.

| tube lens 18 | | | | |
|---|---|---|---|---|
| s | r | d | nd | vd |
| 1 | INF | 112 | | |
| 2 | 91.726 | 5.25 | 1.43875 | 94.93 |
| 3 | −129.825 | 1 | | |
| 4 | 28.474 | 8.95 | 1.497 | 81.54 |
| 5 | INF | 6.29 | 1.51633 | 64.14 |
| 6 | 21.709 | 11.967 | | |
| 7 | −52.914 | 4 | 1.6134 | 44.27 |
| 8 | INF | 29.782 | | |
| 9 | 88.05 | 5 | 1.741 | 52.64 |
| 10 | −306.532 | 1.656 | | |
| 11 | −65.861 | 4.6 | 1.74 | 28.3 |
| 12 | −88.37 | 102.586 | | |
| 13 (image surface) | INF | | | |

Here, s represents the surface number, r represents the radius of curvature (mm), d represents the surface distance (mm), nd represents the refraction index with respect to the d line, and vd represents the Abbe number. Meanwhile, the surface that the surface number s1 indicates represents the surface at the exit pupil position of the objective (the entrance pupil position of the tube lens 18), and the surface that the surface number s13 indicates represents the image surface. Meanwhile, the surface distance d1 represents the distance from the surface that the surface number s1 indicates to the surface that the surface number s2 indicates, which is a distance D2 from the first surface being the lens surface of the tube lens 18 that is closest to the objective to the exit pupil position of the objective. The surface distance d12 represents the distance from the last surface of the tube lens 18 to the image surface.

The tube lens 18 according to the present embodiment satisfies the conditional expressions (1) through (9) as represented in expressions (71) through (79) below. The expressions (71) through (79) respectively correspond to the conditional expressions (1) through (9).

$$D2/FL=0.622 \quad (71)$$

$$FLG1/FL=0.696 \quad (72)$$

$$FLG2/FL=-0.479 \quad (73)$$

$$D1/D0=0.434 \quad (74)$$

$$|RG2/RG1|=2.437 \quad (75)$$

$$NdG2=1.6134 \quad (76)$$

$$vdG1=94.93 \quad (77)$$

$$NdG3p=1.741 \quad (78)$$

$$vdG3n=28.3 \quad (79)$$

Figure 15:
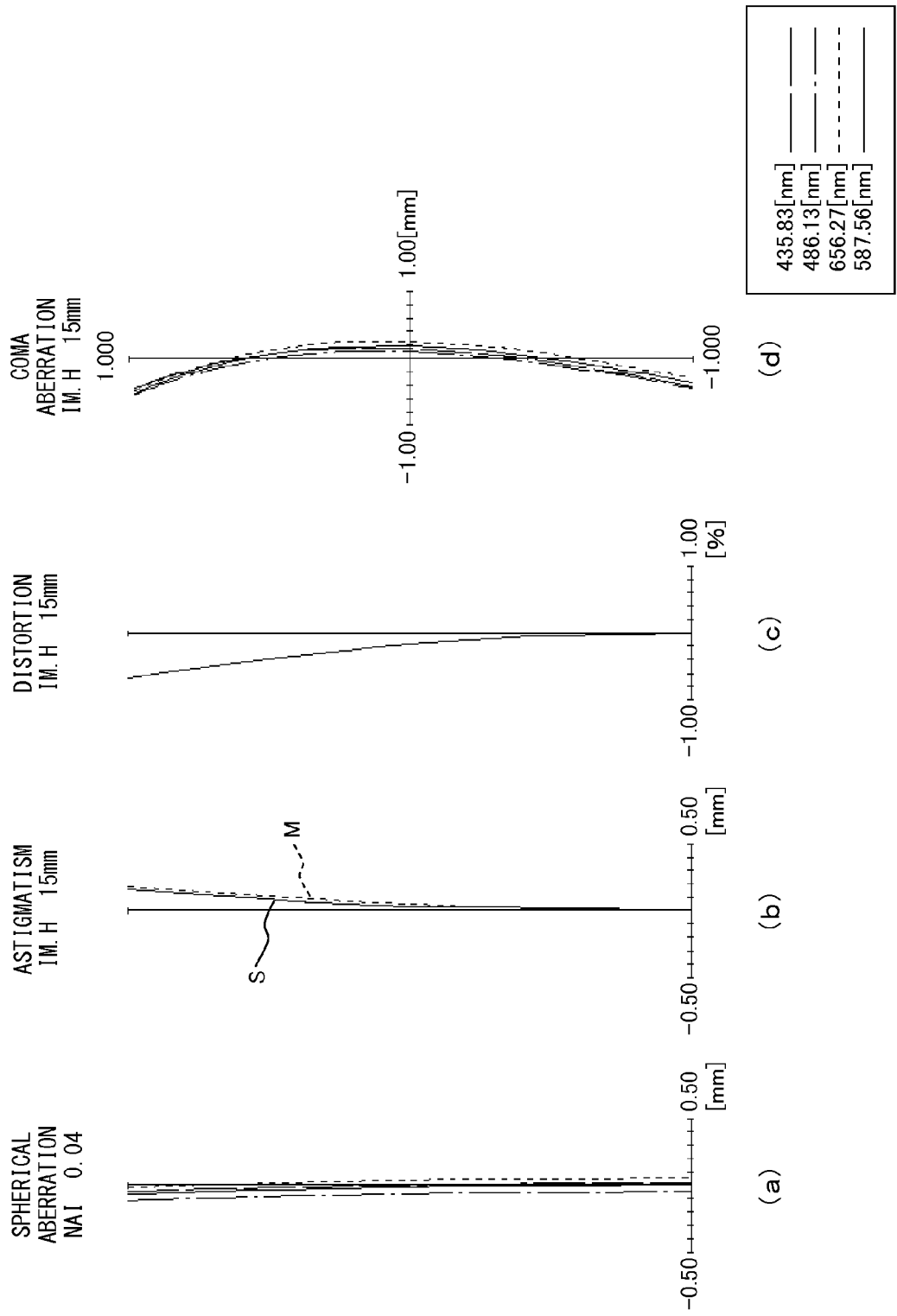
FIG. 15 is an aberration diagram of a tube lens illustrated in FIG. 14.

FIG. 15 is an aberration diagram of the tube lens illustrated in FIG. 14, representing aberration on the image surface in a case in which a parallel light flux falls on from the object side. FIG. 15(a) is a spherical aberration diagram, FIG. 15(b) is an astigmatism diagram, FIG. 15(c) is a distortion diagram, and FIG. 15(d) is a coma aberration diagram. They represent that all the aberrations are corrected in a good condition. Meanwhile, "NAI" in the drawing represents the numerical aperture on the image side of the tube lens 18, and "IM.H" represents the image height (mm). In addition, "M" represents the meridional component, and "S" represents the sagittal component.

<Embodiment 8>

Figure 16:
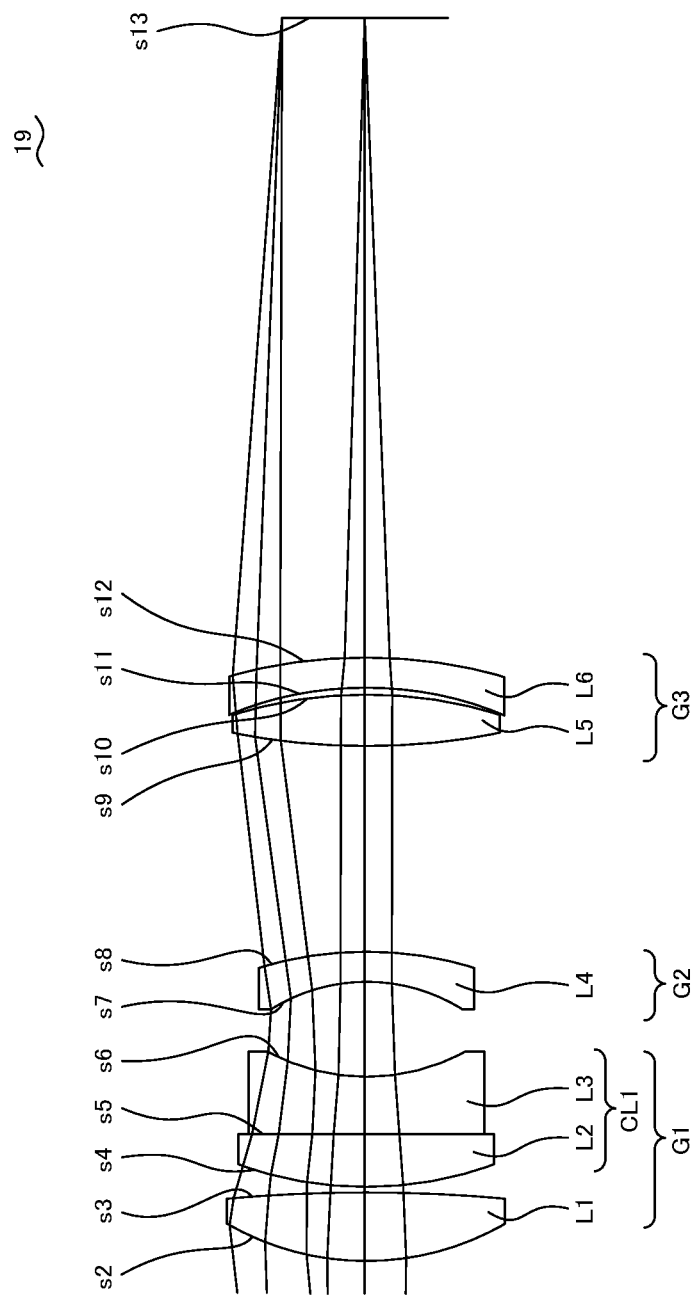
FIG. 16 is a cross-sectional diagram according to embodiment 8 of the present invention.

FIG. 16 is a cross-sectional diagram of a tube lens according to the present embodiment. A tube lens 19 illustrated in FIG. 16 is a tube lens used in combination with an objective of the infinity correction type that enlarges the image of an object, and includes a first lens group G1 having a positive power including a cemented lens CL1 (a lens L2, a lens L3), a second lens group G2 having a negative power, and a third lens group G3 having a positive power as a whole including a positive lens (a lens L5) and a negative lens (a lens 6) in this order from the object side.

More specifically, the first lens group G1 includes a biconvex lens L1, and a cemented lens CL1 composed of a planoconvex lens L2 whose convex side faces the object side and a planoconcave lens L3 whose concave side faces the image side, in this order from the object side. The second lens group G2 is composed of a meniscus lens L4 whose concave side faces the object side. The third lens group G3 includes a biconvex lens L5 and a meniscus lens L6 whose concave side faces the object side, in this order from the object side.

The first lens group G1 of the tube lens 19 includes the planoconcave lens L3 as the lens whose concave side faces the image side, and the second lens group includes the meniscus lens L4 as the lens whose concave side laces the object side.

Hereinafter, various data of the tube lens 19 according to the present embodiment are described. Meanwhile, the reference wavelength is the d line (587.56 nm).

The focal length FL of the tube lens 19, the focal length FLG1 of the first lens group, the focal length FLG2 of the second lens group, the numerical aperture on the image side NAI, and the image height IM.H are respectively as follows.

FL=180 mm, FLG1=176.93 mm, FLG2=−111.63 mm, NAI=0.04, IM.H=15 mm

The lens data of the tube lens 19 according to the present embodiment are as follows.

| tube lens 19 | | | | |
|---|---|---|---|---|
| s | r | d | nd | vd |
| 1 | INF | 212 | | |
| 2 | 51.743 | 11 | 1.56907 | 71.3 |
| 3 | −354.9474 | 1 | | |
| 4 | 68.456 | 8.9 | 1.43875 | 94.93 |
| 5 | INF | 9.5 | 1.72916 | 54.68 |
| 6 | 40.114 | 15.678 | | |
| 7 | −34.85 | 5 | 1.6134 | 44.27 |
| 8 | −74.841 | 33.902 | | |
| 9 | 128.699 | 8.05 | 1.741 | 52.64 |
| 10 | −91.221 | 1.275 | | |
| 11 | −64.759 | 4.8 | 1.72151 | 29.23 |
| 12 | −117.308 | 105.895 | | |
| 13 (image surface) | INF | | | |

Here, s represents the surface number, r represents the radius of curvature (mm), d represents the surface distance (mm), rid represents the refraction index with respect to the d line, and vd represents the Abbe number. Meanwhile, the surface that the surface number s1 indicates represents the surface at the exit pupil position of the objective (the entrance pupil position of the tube lens 19), and the surface that the surface number s13 indicates represents the image surface. Meanwhile, the surface distance d1 represents the distance from the surface that the surface number s1 indicates to the surface that the surface number s2 indicates, which is a distance D2 from the first surface being the lens surface of the tube lens 19 that is closest to the objective to the exit pupil position of the objective. The surface distance d12 represents the distance from the last surface of the tube lens 19 to the image surface.

The tube lens 19 according to the present embodiment satisfies the conditional expressions (1) through (9) as represented in expressions (81) through (89) below. The expressions (81) through (89) respectively correspond to the conditional expressions (1) through (9).

$$D2/FL=1.178 \tag{81}$$

$$FLG1/FL=0.983 \tag{82}$$

$$FLG2/FL=-0.620 \tag{83}$$

$$D1/D0=0.483 \tag{84}$$

$$|RG2/RG1|=0.869 \tag{85}$$

$$NdG2=1.6134 \tag{86}$$

$$vdG1=94.93 \tag{87}$$

$$NdG3p=1.741 \tag{88}$$

$$vdG3n=29.23 \tag{89}$$

Figure 17:
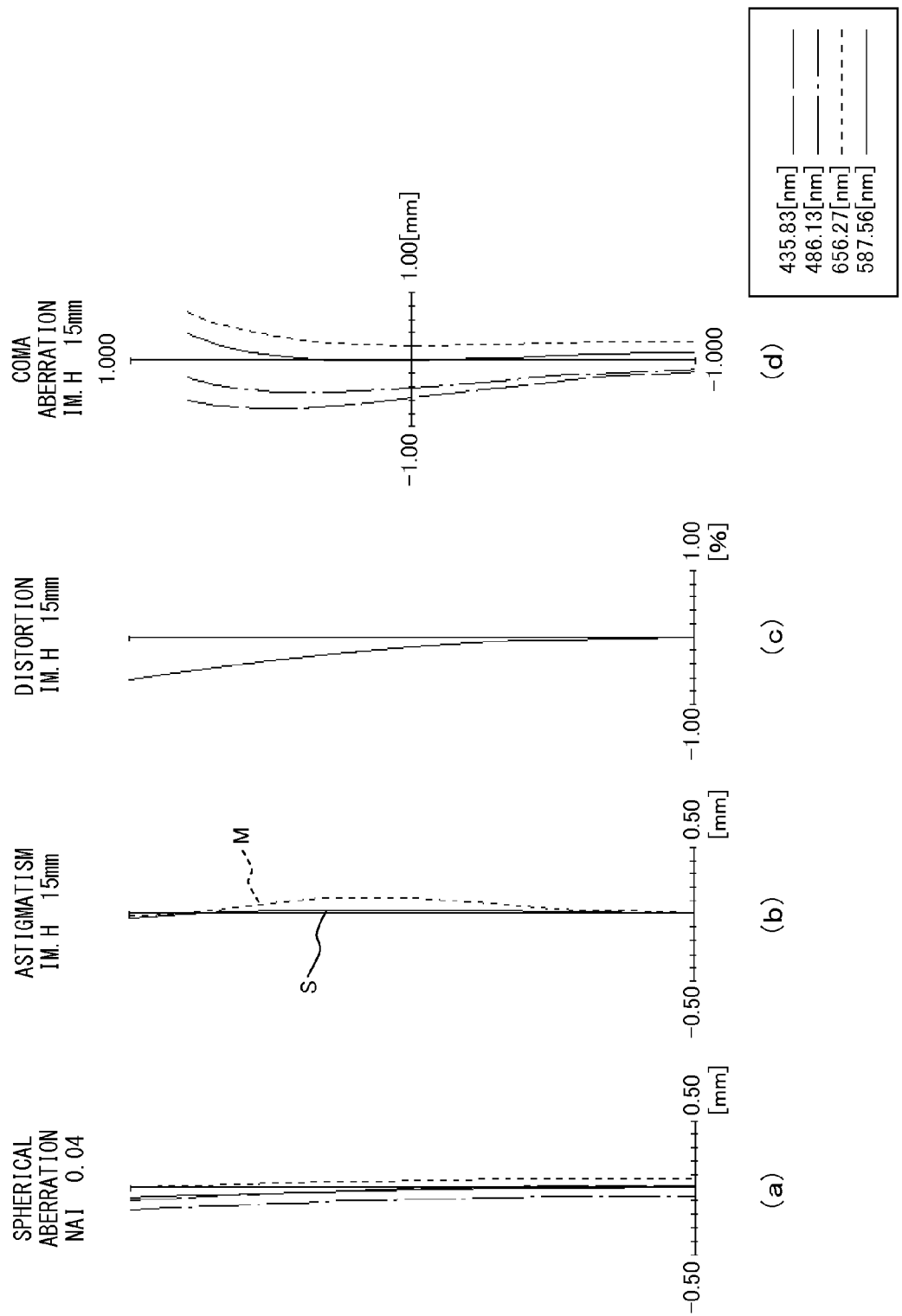
FIG. 17 is an aberration diagram of a tube lens illustrated in FIG. 16.

FIG. 17 is an aberration diagram of the tube lens illustrated in FIG. 16, representing aberration on the image surface in a case in which a parallel light flux falls on from the object side. FIG. 17(a) is a spherical aberration diagram, FIG. 17(b) is an astigmatism diagram, FIG. 17(c) is a distortion diagram, and FIG. 17(d) is a coma aberration diagram. They represent that all the aberrations are corrected in a good condition. Meanwhile, "NAI" in the drawing represents the numerical aperture on the image side of the tube lens 19, and "IM.H" represents the image height (mm). In addition, "M" represents the meridional component, and "S" represents the sagittal component.

<Embodiment 9>

Figure 18:
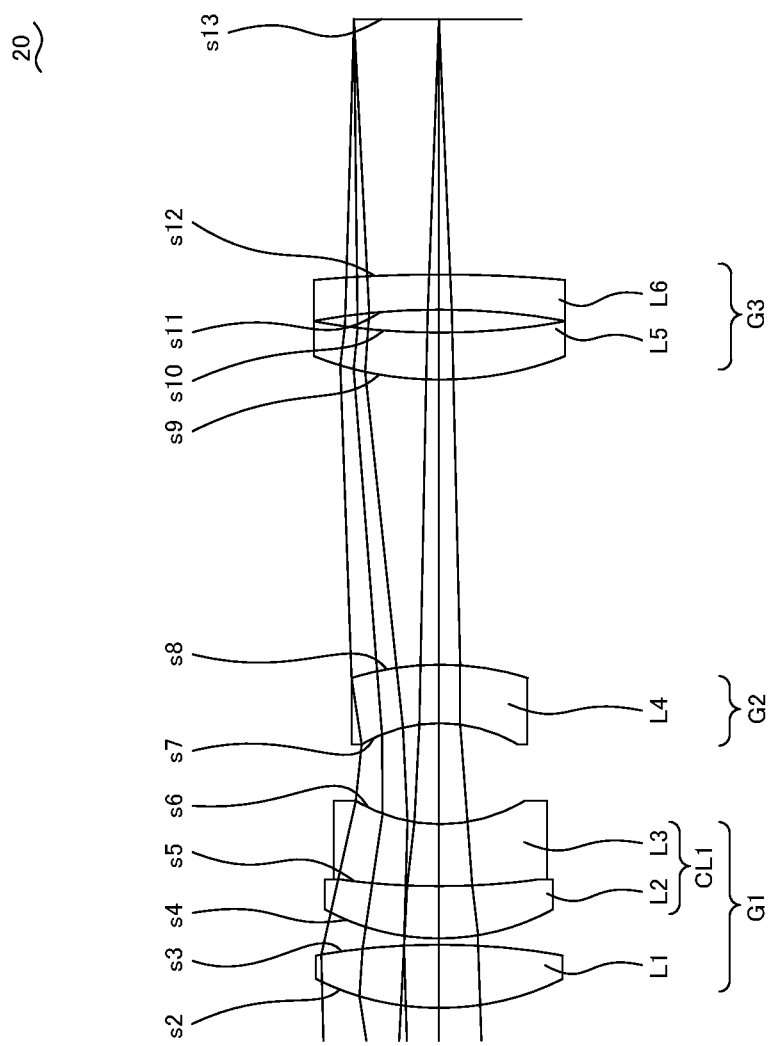
FIG. 18 is a cross-sectional diagram according to embodiment 9 of the present invention.

FIG. 18 is a cross-sectional diagram of a tube lens according to the present embodiment. A tube lens 20 illustrated in FIG. 18 is a tube lens used in combination with an objective of the infinity correction type that enlarges the image of an object, and includes a first lens group G1 having a positive power including a cemented lens CL1 (a lens L2, a lens L1), a second lens group G2 having a negative power, and a third lens group G3 having a positive power as a whole including a positive lens (a lens L5) and a negative lens (a lens 6) in this order from the object side.

More specifically, the first lens group G1 includes a biconvex lens L1, and a cemented lens CL1 composed of a meniscus lens L2 whose concave side faces the image side and a meniscus lens L3 whose concave side faces the image side, in this order from the object side. The second lens group G2 is composed of a meniscus lens L4 whose concave side faces the object side. The third lens group G3 includes a meniscus lens LB whose concave side faces the image side and a meniscus lens L6 whose concave side faces the object side, in this order from the object side.

The first lens group G1 of the tube lens 20 includes the meniscus lens L3 as the lens whose concave side faces the image side, and the second lens group includes the meniscus lens L4 as the lens whose concave side faces the object side.

Hereinafter, various data of the tube lens 20 according to the present embodiment are described. Meanwhile, the reference wavelength is the d line (587.56 nm).

The focal length FL of the tube lens 20, the focal length FLG1 of the first lens group, the focal length FLG2 of the second lens group, the numerical aperture on the image side NAI, and the image height IM.H are respectively as follows.
FL=180 mm, FL1G=116.35 mm, FLG2=−118.01 mm,
NAI=0.04, IM.H=15 mm The lens data of the tube lens 20 according to the present embodiment are as follows.

| | tube lens 20 | | | |
|---|---|---|---|---|
| s | r | d | nd | vd |
| 1 | INF | 162 | | |
| 2 | 51.881 | 10.4 | 1.497 | 81.54 |
| 3 | −187.924 | 1 | | |
| 4 | 41.824 | 9.3 | 1.497 | 81.54 |
| 5 | 291.175 | 10 | 1.788 | 47.37 |
| 6 | 33.509 | 16.745 | | |
| 7 | −30.061 | 9.5 | 1.53172 | 48.84 |
| 8 | −64.037 | 47.629 | | |
| 9 | 60.347 | 8 | 1.8061 | 40.92 |
| 10 | 144.524 | 4.082 | | |
| 11 | −94.659 | 5.5 | 1.62004 | 36.26 |
| 12 | −226.77 | 42.844 | | |
| 13 (image surface) | INF | | | |

Here, s represents the surface number, r represents the radius of curvature (mm), d represents the surface distance (mm), nd represents the refraction index with respect to the d line, and vd represents the Abbe number. Meanwhile, the surface that the surface number s1 indicates represents the surface at the exit pupil position of the objective (the entrance pupil position of the tube lens 20), and the surface that the surface number s13 indicates represents the image surface. Meanwhile, the surface distance d1 represents the distance from the surface that the surface number s1 indicates to the surface that the surface number s2 indicates, which is a distance D2 from the first surface being the lens surface of the tube lens 20 that is closest to the objective to the exit pupil position of the objective. The surface distance d12 represents the distance from the last surface of the tube lens 20 to the image surface.

The tube lens 20 according to the present embodiment satisfies the conditional expressions (1) through (9) as represented in expressions (91) through (99) below. The expressions (91) through (99) respectively correspond to the conditional expressions (1) through (9).

$$D2/FL=0.9 \tag{91}$$

$$FLG1/FL=0.646 \tag{92}$$

$$FLG2/FL=-0.656 \tag{93}$$

$$D1/D0=0.740 \tag{94}$$

$$|RG2/RG1|=0.897 \tag{95}$$

NdG2=1.53172 (96)

vdG1=81.54 (97)

NdG3p=1.8061 (98)

vdG3n=36.26 (99)

Figure 19:
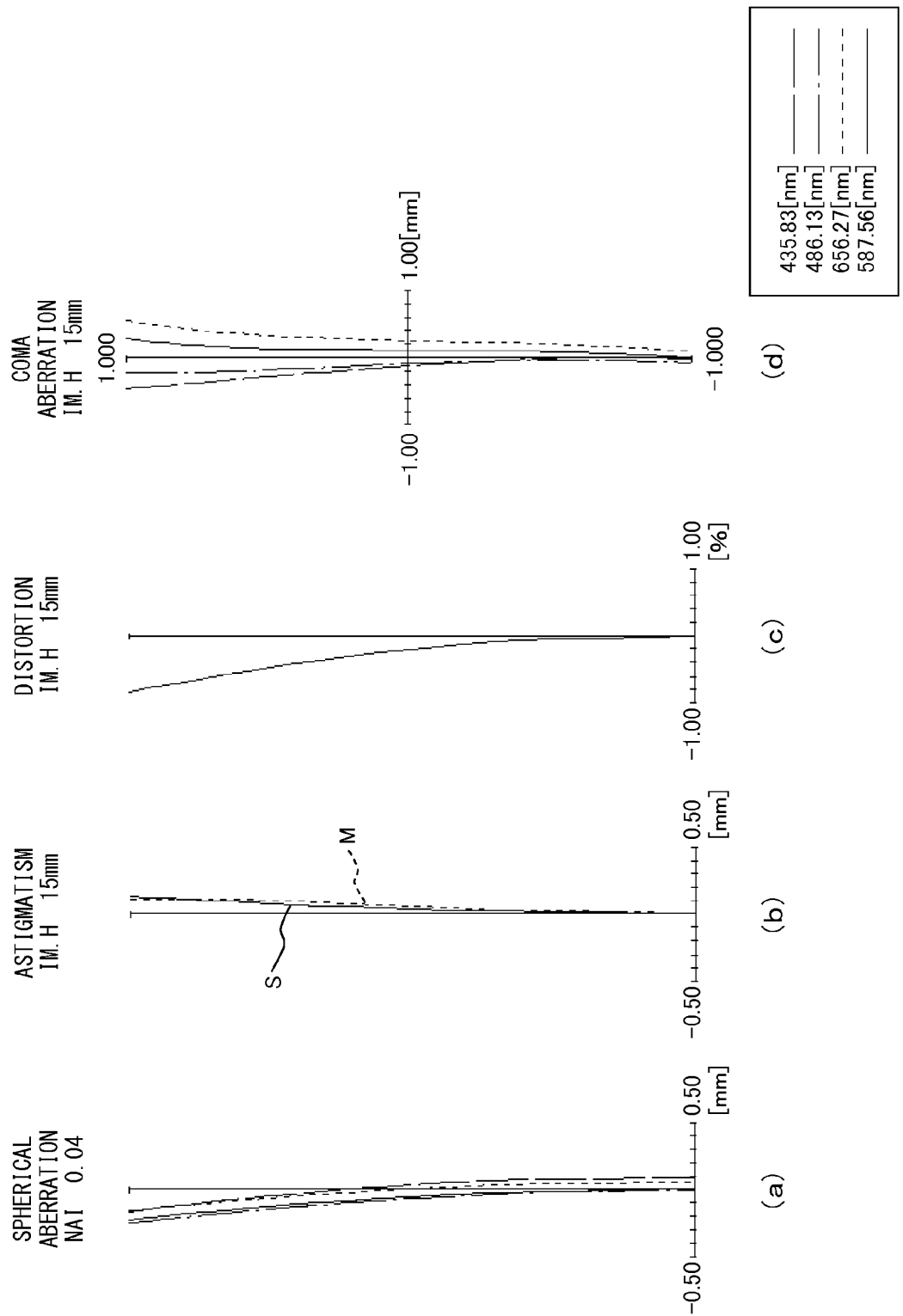
FIG. 19 is an aberration diagram of a tube lens illustrated in FIG. 18.

FIG. 19 is an aberration diagram of the tube lens illustrated in FIG. 18, representing aberration on the image surface in a case in which a parallel light, flux falls on from the object side. FIG. 19(a) is a spherical aberration diagram, FIG. 19(b) is an astigmatism diagram, FIG. 19(c) is a distortion diagram, and FIG. 19(d) is a coma aberration diagram. They represent that all the aberrations are corrected in a good condition. Meanwhile, "NAI" in the drawing represents the numerical aperture on the image side of the tube lens 20, and "IM.H" represents the image height (mm). In addition, "M" represents the meridional component, and "S" represents the sagittal component.

<Embodiment 10>

Figure 20:
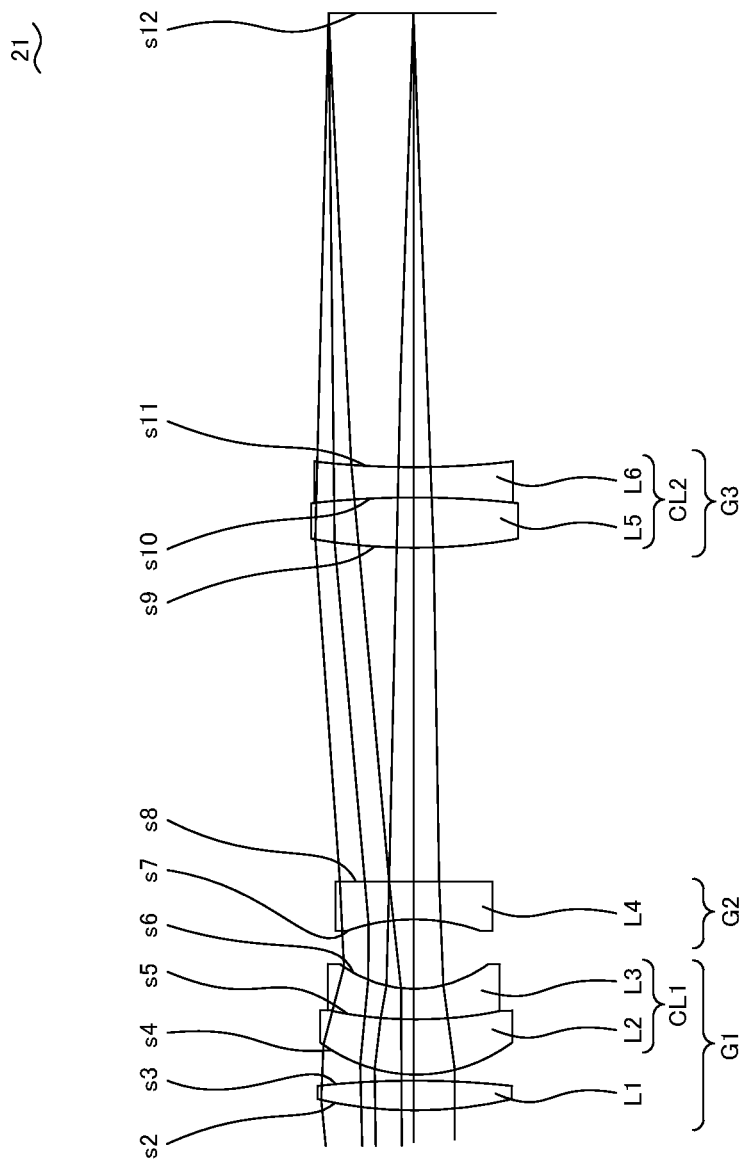
FIG. 20 is a cross-sectional diagram according to embodiment 10 of the present invention.

FIG. 20 is a cross-sectional diagram of a tube lens according to the present embodiment. A tube lens 21 illustrated in FIG. 20 is a tube lens used in combination with an objective of the infinity correction type that enlarges the image of an object, and includes a first lens group G1 having a positive power including a cemented lens CL1 (a lens L2, a lens L3), a second lens group G2 having a negative power, and a third lens group G3 having a positive power as a whole including a positive lens (a lens L5) and a negative lens (a lens 6) in this order from the object side.

More specifically, the first lens group G1 includes a biconvex lens L1, and a cemented lens CL1 composed of a meniscus lens L2 whose concave side faces the image side and a meniscus lens L3 whose concave side faces the image side, in this order from the object side. The second lens group G2 is composed of a meniscus lens L4 whose concave side faces the object side. The third lens group G3 includes a cemented lens CL2 composed of a biconvex lens L5 and a biconcave lens L6, in this order from the object side.

The first lens group G1 of the tube lens 21 includes the meniscus lens L3 as the lens whose concave side faces the image side, and the second lens group includes the meniscus lens L4 as the lens whose concave side faces the object side.

Hereinafter, various data of the tube lens 21 according to the present embodiment are described. Meanwhile, the reference wavelength is the d line (587.56 nm).

The focal length FL of the tube lens 21, the focal length FLG1 of the first lens group, the focal length FLG2 of the second lens group, the numerical aperture on the image side NAI, and the image height IM.H are respectively as follows.

FL-180 mm, FL1G=118.45 mm, FLG2=−112.19 mm, NAI=0.04, IM.H=15 mm

The lens data of the tube lens 21 according to the present embodiment are as follows.

| tube lens 21 | | | | |
|---|---|---|---|---|
| s | r | d | nd | vd |
| 1 | INF | 112 | | |
| 2 | 80.335 | 5.17 | 1.56907 | 71.3 |
| 3 | −174.491 | 1 | | |
| 4 | 29.396 | 9.16 | 1.48749 | 70.23 |
| 5 | 84.019 | 5 | 1.6134 | 44.27 |
| 6 | 23.149 | 11.355 | | |
| 7 | −52.159 | 6.65 | 1.6134 | 44.27 |
| 8 | −225.924 | 55.132 | | |

-continued

| tube lens 21 | | | | |
|---|---|---|---|---|
| s | r | d | nd | vd |
| 9 | 107.512 | 8.37 | 1.788 | 47.37 |
| 10 | −261.058 | 5.43 | 1.74951 | 35.33 |
| 11 | 441.095 | 74.96 | | |
| 12 (image surface) | INF | | | |

Here, s represents the surface number, r represents the radius of curvature (mm), d represents the surface distance (mm), nd represents the refraction index with respect to the d line, and vd represents the Abbe number. Meanwhile, the surface that the surface number s1 indicates represents the surface at the exit pupil position of the objective (the entrance pupil position of the tube lens 21), and the surface that the surface number s12 indicates represents the image surface. Meanwhile, the surface distance d1 represents the distance from the surface that the surface number s1 indicates to the surface that the surface number s2 indicates, which is a distance D2 from the first surface being the lens surface of the tube lens 21 that is closest to the objective to the exit pupil position of the objective. The surface distance d11 represents the distance from the last surface of the tube lens 21 to the image surface.

The tube lens 21 according to the present embodiment satisfies the conditional expressions (1) through (9) as represented in expressions (101) through (109) below. The expressions (101) through (109) respectively correspond to the conditional expressions (1) through (9).

$D2/FL=0.622$ (101)

$FLG1/FL=0.658$ (102)

$FLG2/FL=-0.623$ (103)

$D1/D0=0.589$ (104)

$|RG2/RG1|=2.253$ (105)

$NdG2=1.6134$ (106)

$vdG1=71.3$ (107)

$NdG3p=1.788$ (108)

$vdG3n=35.33$ (109)

Figure 21:
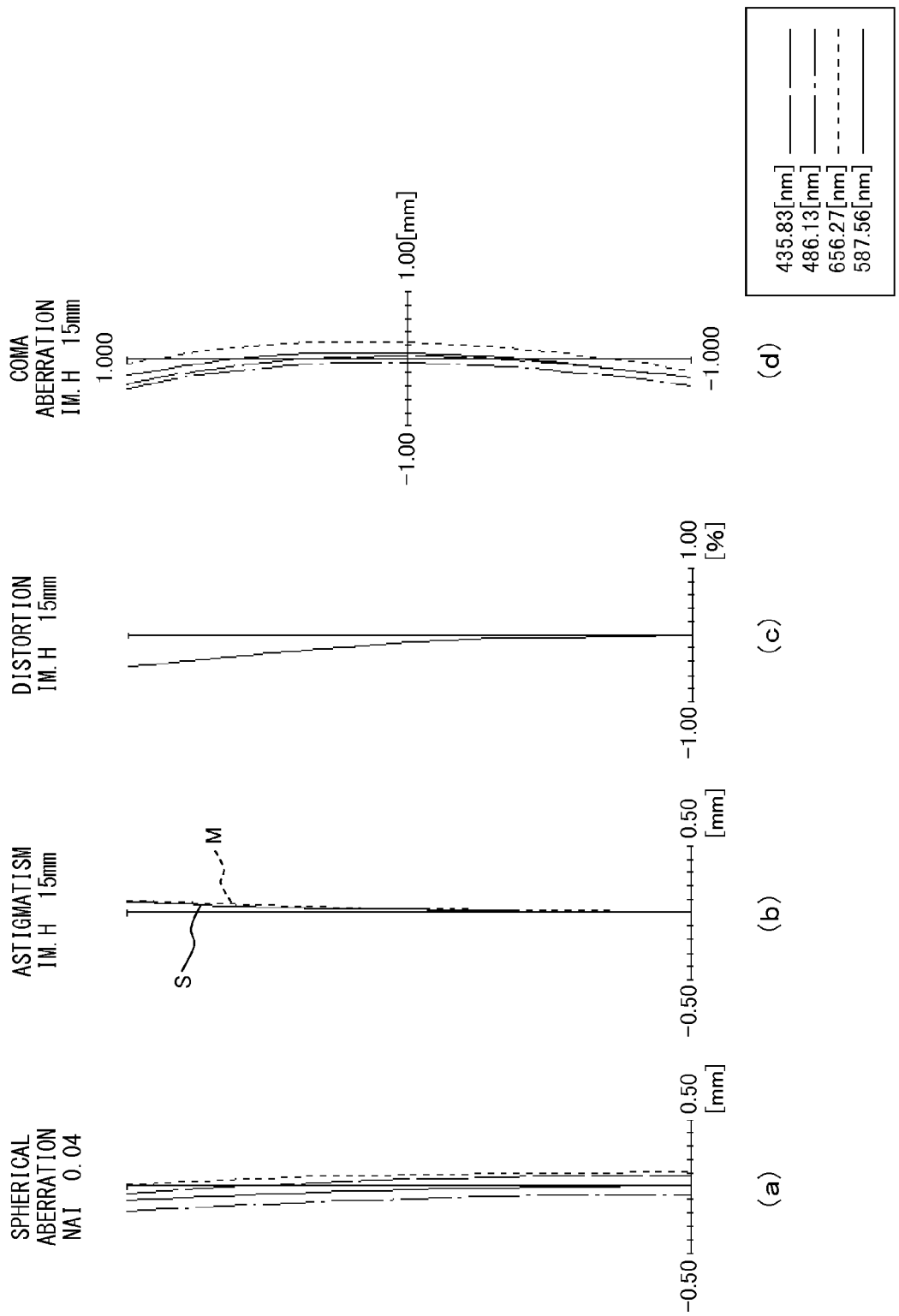
FIG. 21 is an aberration diagram of a tube lens illustrated in FIG. 20.

FIG. 21 is an aberration diagram of the tube lens illustrated in FIG. 20, representing aberration on the image surface in a case in which a parallel light flux falls on from the object side. FIG. 21(a) is a spherical aberration diagram, FIG. 21(b) is an astigmatism diagram, FIG. 21(c) is a distortion diagram, and FIG. 21(d) is a coma aberration diagram. They represent that all the aberrations are corrected in a good condition. Meanwhile, "NAI" in the drawing represents the numerical aperture on the image side of the tube lens 21, and "IM.H" represents the image height (mm). In addition, "M" represents the meridional component, and "S" represents the sagittal component.

What is claimed is:

1. A tube lens used in combination with an objective of an infinite correction type that enlarges an image of an object, the tube lens consisting of, in a following order from an object side;

a first lens group including a cemented lens and having a positive power;
a second lens group having a negative power; and
a third lens group including a positive lens and a negative lens and having a positive power as a whole,
wherein:
the first lens group includes a lens having a concave surface facing an image side;
the second lens group includes a lens having a concave surface facing the object side, and
the tube lens satisfies the following conditional expressions:

$0.3 < D2/FL < 1.3;$ $0 < |RG2/RG1| < 3;$ $1.5 < NdG2;$ $70 < vdG1;$ $NdG3p > 1.7;$ and $vdG3n < 40,$ where FL is a focal length of the tube lens, D2 is a distance from a lens surface of the tube lens closest to the objective to an exit pupil position of the objective, RG1 is a radius of curvature of the concave surface of the lens in the first lens group, RG2 is a radius of curvature of the concave surface of the lens in the second lens group, NdG2 is a refraction index of the lens in the second lens group having the concave surface facing the object side with respect to a d line, vdG1 is a highest Abbe number in Abbe numbers of a lens having a positive power included in the first lens group, NdG3p is a refraction index of the positive lens included in the third lens group with respect to the d line, and vdG3n is an Abbe number of the negative lens included in the third lens group.

2. The tube lens according to claim 1, wherein the tube lens satisfies following conditional expressions:

$0.3 < FLG1/FL < 3;$ $-4 < FLG2/FL < -0.15;$ and $0.3 < D1/D0 < 0.8,$ where FLG1 is a focal length of the first lens group, FLG2 is a focal length of the second lens group, DO is a distance from a lens surface of the tube lens closest to the objective to an image surface, and D1 is a distance from the lens surface of the tube lens closest to the objective to a lens surface of the tube lens closest to the image surface.

3. An imaging optical system comprising the tube lens according to claim 1.

4. A microscope comprising the tube lens according to claim 1.

5. The tube lens according to claim 1, wherein the second lens group consists of the lens having the concave surface on the object side, said lens being a single lens.

6. The tube lens according to claim 1, wherein the third lens group consists of the positive lens and the negative lens.

7. The tube lens according to claim 1, wherein the first lens group consists of a single lens and the cemented lens, and at least one of the single lens and the cemented lens has the concave surface facing the image side.

8. The microscope according to claim 4, further comprising an imaging device placed on an image surface of the tube lens,
wherein the imaging device is a CCD image sensor.

9. The microscope according to claim 8, further comprising an illumination optical system to illuminate an object by Kohler illumination.

* * * * *